United States Patent
Suzuki et al.

(10) Patent No.: US 10,190,457 B2
(45) Date of Patent: Jan. 29, 2019

(54) EXHAUST GAS PURIFICATION APPARATUS FOR AN INTERNAL COMBUSTION ENGINE

(71) Applicant: Toyota Jidosha Kabushiki Kaisha, Toyota-shi Aichi-ken (JP)

(72) Inventors: Kazuya Suzuki, Susono (JP); Takashi Kawai, Susono (JP); Yuji Miyoshi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 68 days.

(21) Appl. No.: 15/650,284

(22) Filed: Jul. 14, 2017

(65) Prior Publication Data

US 2018/0023437 A1 Jan. 25, 2018

(30) Foreign Application Priority Data

Jul. 22, 2016 (JP) .................................. 2016-144576
May 15, 2017 (JP) .................................. 2017-096269

(51) Int. Cl.
| | |
|---|---|
| *F01N 3/00* | (2006.01) |
| *F01N 3/10* | (2006.01) |
| *F01N 3/18* | (2006.01) |
| *F01N 9/00* | (2006.01) |
| *F01N 13/00* | (2010.01) |
| *F02D 41/00* | (2006.01) |

(52) U.S. Cl.
CPC ............. *F01N 3/101* (2013.01); *F01N 3/18* (2013.01); *F01N 9/00* (2013.01); *F01N 13/009* (2014.06); *F01N 13/0093* (2014.06); *F02D 41/0052* (2013.01); *F01N 2430/06* (2013.01); *F01N 2610/1406* (2013.01); *F01N 2900/1402* (2013.01); *F01N 2900/1602* (2013.01); *F01N 2900/1624* (2013.01)

(58) Field of Classification Search
USPC .................. 60/274, 285, 286, 297, 301, 303
See application file for complete search history.

(56) References Cited

U.S. PATENT DOCUMENTS 7,788,903 B2 *  9/2010  Nakagawa .............. F01N 3/101
                                                   123/672
8,944,037 B2 *  2/2015  Yonekawa ........... F02D 41/1441
                                                   123/672

(Continued)

FOREIGN PATENT DOCUMENTS

| JP | 2005-061221 A | 3/2005 |
| JP | 2008-223644 A | 9/2008 |
| WO | 2013/014788 A1 | 1/2013 |

*Primary Examiner* — Binh Q Tran
(74) *Attorney, Agent, or Firm* — Dinsmore & Shohl LLP

(57) ABSTRACT

A lean control, in which a target air fuel ratio is made to vary to a lean air fuel ratio and a rich air fuel ratio across a lean air fuel ratio, and a rich control, in which the target air fuel ratio is made to vary to a lean air fuel ratio and a rich air fuel ratio across a rich air fuel ratio, are alternately carried out, wherein when carrying out the lean control, a period per one time in which the target air fuel ratio becomes the lean air fuel ratio is made longer than a period per one time in which the target air fuel ratio becomes the rich air fuel ratio, and a deviation of the lean air fuel ratio from the lean air fuel ratio is made smaller than a deviation of the rich air fuel ratio from the lean air fuel ratio.

7 Claims, 13 Drawing Sheets

(56) References Cited

U.S. PATENT DOCUMENTS

| | | | |
|---|---|---|---|
| 9,845,756 B2* | 12/2017 | Bisaiji | F02D 41/0275 |
| 9,863,354 B2* | 1/2018 | Okazaki | F02D 41/0295 |
| 9,951,707 B2* | 4/2018 | Yamaguchi | F02D 41/2461 |
| 2005/0028517 A1 | 2/2005 | Nakagawa et al. | |
| 2005/0217244 A1* | 10/2005 | Kamoto | F01N 3/101 |
| | | | 60/277 |
| 2014/0208722 A1 | 7/2014 | Mori et al. | |

* cited by examiner

EXHAUST GAS PURIFICATION APPARATUS FOR AN INTERNAL COMBUSTION ENGINE

CROSS REFERENCE TO RELATED APPLICATIONS

This application claims priority to Japanese Patent Application No. 2016-144576 filed on Jul. 22, 2016, and Japanese Patent Application No. 2017-96269 filed on May 15, 2017 the entire contents of which are incorporated by reference herein.

BACKGROUND

Field of the Disclosure

The present disclosure relates to an exhaust gas purification apparatus for an internal combustion engine.

Description of the Related Art

There has been known a technique in which an upstream catalyst and a downstream catalyst are arranged sequentially from an upstream side of an exhaust passage of an internal combustion engine, wherein when the internal combustion engine is operated at a lean air fuel ratio, and when the temperature of the downstream catalyst is raised, a reducing agent is supplied, for example, periodically or intermittently, so as to instantaneously adjust the air fuel ratio of exhaust gas flowing into the upstream catalyst to a rich air fuel ratio (for example, refer to patent literature 1). According to this, an amount of the reducing agent flowing into the upstream catalyst and passing therethrough without reaction in the upstream catalyst increases, so an amount of the reducing agent, which reacts in the downstream catalyst, can be made to increase. Accordingly, it is possible to increase the amount of the reducing agent reacting in the downstream catalyst, while suppressing a rise in the temperature of the upstream catalyst due to the reducing agent reacting in the upstream catalyst.

CITATION LIST

Patent Literature

Patent Literature 1: International Publication No. 2013/014788
Patent Literature 2: Japanese Patent Laid-Open Publication No. 2005-061221
Patent Literature 3: Japanese Patent Laid-Open Publication No. 2008-223644

SUMMARY

Technical Problem

Here, there has been proposed a technique in which two three-way catalysts are arranged in an exhaust passage of an internal combustion engine at an upstream side and at a downstream side thereof, and a target air fuel ratio is made to vary from a stoichiometric air fuel ratio to a lean side and a rich side at a relatively short interval, and at the same time, a target reference air fuel ratio, which is a target mean value of the target air fuel ratio of the internal combustion engine, is made to change from the stoichiometric air fuel ratio to a lean side and a rich side in an alternate manner at an interval longer than the relatively short interval. Here, note that a target reference air fuel ratio at a leaner side than the stoichiometric air fuel ratio is referred to as a reference lean air fuel ratio, and a target reference air fuel ratio at a richer side than the stoichiometric air fuel ratio is referred to as a reference rich air fuel ratio. When the target air fuel ratio varies whether the target reference air fuel ratio is at the rich side or at the lean side, it varies across or on opposite sides of the stoichiometric air fuel ratio. With such a construction, the air fuel ratio of the exhaust gas flowing into the three-way catalyst arranged at the upstream side (hereinafter, also referred to as a first catalyst) changes according to the target air fuel ratio, and the air fuel ratio of the exhaust gas flowing into the three-way catalyst arranged at the downstream side (hereinafter, also referred to as a second catalyst) changes according to the target reference air fuel ratio. Accordingly, the target reference air fuel ratio is set according to an air fuel ratio required by the second catalyst.

With such a construction, by varying the target air fuel ratio between the rich air fuel ratio and the lean air fuel ratio at the relatively short interval, oxygen becomes surplus in the internal combustion engine at the time when the target air fuel ratio is the lean air fuel ratio, which is an air fuel ratio larger than the stoichiometric air fuel ratio, as a result of which the exhaust gas of the lean air fuel ratio including surplus oxygen is supplied to the first catalyst. At the time when the target air fuel ratio is the rich air fuel ratio, which is an air fuel ratio smaller than the stoichiometric air fuel ratio, fuel becomes surplus in the internal combustion engine, the exhaust gas of the rich air fuel ratio including HC, which is surplus fuel, and CO produced by incomplete combustion, is supplied to the first catalyst. For this reason, in the first catalyst, the HC and CO are oxidized to produce heat, and the temperature of the first catalyst goes up. In addition, when the target reference air fuel ratio is the reference rich air fuel ratio, by changing the target reference air fuel ratio to the reference rich air fuel ratio and the reference lean air fuel ratio in an alternate manner, the oxygen stored in the first catalyst is released so that the HC and CO in the exhaust gas are thereby oxidized. Then, when oxygen is sufficiently released from the first catalyst, the HC and CO will become unable to be oxidized in the first catalyst, and the exhaust gas of the rich air fuel ratio will flow out from the first catalyst. With this, the exhaust gas of the rich air fuel ratio containing HC and CO is supplied to the second catalyst. Moreover, when the target reference air fuel ratio is the reference lean air fuel ratio, oxygen is stored into the first catalyst, but when oxygen has been sufficiently stored in the first catalyst, oxygen will become unable to be stored into the first catalyst, so that the exhaust gas of the lean air fuel ratio will flow out from the first catalyst. With this, the exhaust gas of the lean air fuel ratio containing oxygen is supplied to the second catalyst. Accordingly, by changing the target reference air fuel ratio to the reference rich air fuel ratio and the reference lean air fuel ratio in an alternate manner, the exhaust gas of the lean air fuel ratio containing oxygen and the exhaust gas of the rich air fuel ratio including HC and CO are also supplied to the second catalyst in an alternate manner. For this reason, in the second catalyst, the HC and CO are oxidized to produce heat, so that the temperature of the first catalyst goes up.

However, when the target air fuel ratio is made to vary to the rich side and the lean side across the stoichiometric air fuel ratio at a relatively short interval, while adjusting the target reference air fuel ratio to the reference lean air fuel ratio, the degree of leanness of the air fuel ratio may become too large at the time of the target air fuel ratio being the lean air fuel ratio, so it may become difficult to remove or reduce NOx in the first catalyst and the second catalyst, thus giving rise to a fear that NOx may flow out from the second catalyst. On the other hand, when the target air fuel ratio is made to vary to the rich side and the lean side across the stoichiometric air fuel ratio at a relatively short interval, while adjusting the target reference air fuel ratio to the reference rich air fuel ratio, the degree of richness of the air fuel ratio may become too large at the time of the target air fuel ratio being the rich air fuel ratio, so it may become difficult to remove or oxidize HC and CO in the first catalyst and the second catalyst, thus giving rise to a fear that HC and CO may flow out from the second catalyst.

The present disclosure has been made in view of the problems as mentioned above, and the object of the disclosure is to decrease the substances flowing out without being removed (reduced or oxidized) by a downstream side catalyst, when the temperature of the downstream side catalyst is raised, in cases where catalysts are arranged at an upstream side portion and at a downstream side portion of an exhaust passage in an internal combustion engine.

Solution to Problem

In order to solve the above-mentioned problems, there is provided an exhaust gas purification apparatus for an internal combustion engine which includes: a first catalyst in the form of a three-way catalyst that is arranged in an exhaust passage of the internal combustion engine, and has an oxygen storage capacity; a second catalyst in the form of a three-way catalyst that is arranged in said exhaust passage at the downstream side of said first catalyst, and has an oxygen storage capacity; and a controller configured to make a target air fuel ratio of said internal combustion engine vary; wherein said controller configured to carry out lean control and rich control in an alternate manner, said lean control setting a reference lean air fuel ratio, which is an air fuel ratio set as a target mean value of the target air fuel ratio at the time of making the target air fuel ratio of said internal combustion engine vary and which is an air fuel ratio leaner than a stoichiometric air fuel ratio, said lean control making the target air fuel ratio of said internal combustion engine vary between a first lean air fuel ratio, which is an air fuel ratio leaner than said reference lean air fuel ratio, and a first rich air fuel ratio, which is an air fuel ratio richer than the stoichiometric air fuel ratio, and said rich control setting a reference rich air fuel ratio, which is an air fuel ratio set as a target mean value of the target air fuel ratio at the time of making the target air fuel ratio of said internal combustion engine vary and which is an air fuel ratio richer than the stoichiometric air fuel ratio, said rich control making the target air fuel ratio of said internal combustion engine vary between a second lean air fuel ratio, which is an air fuel ratio leaner than the stoichiometric air fuel ratio, and a second rich air fuel ratio, which is an air fuel ratio richer than the reference rich air fuel ratio; and when making said target air fuel ratio vary in the case of carrying out said lean control, said controller configured to make a period per one time in which said target air fuel ratio becomes said first lean air fuel ratio longer than a period per one time in which said target air fuel ratio becomes said first rich air fuel ratio, and make a deviation of said first lean air fuel ratio from said reference lean air fuel ratio smaller than a deviation of said first rich air fuel ratio from said reference lean air fuel ratio.

By carrying out the rich control and the lean control in an alternate manner, an air fuel ratio used as a reference (the target mean value of the target air fuel ratio, and hereinafter, also referred to as a target reference air fuel ratio) changes to the reference rich air fuel ratio and the reference lean air fuel ratio in an alternate manner. Even when any of the lean control and the rich control is carried out, the target air fuel ratio varies to the rich side and the lean side across the stoichiometric air fuel ratio. Here, note that the reference lean air fuel ratio may vary during the lean control is carried out, and the reference rich air fuel ratio may change during the rich control is carried out. The reference rich air fuel ratio and the reference lean air fuel ratio are set so as to raise the second catalyst in a suitable manner.

By making the target air fuel ratio of the internal combustion engine vary to the rich side and the lean side across the stoichiometric air fuel ratio, exhaust gas of the lean air fuel ratio containing oxygen and exhaust gas of the rich air fuel ratio containing HC and CO flow into the first catalyst in an alternate manner. In that case, in the first catalyst, the HC and CO are oxidized by oxygen to produce heat, so the temperature of the first catalyst goes up. Here, because the first catalyst has the oxygen storage capacity, when the air fuel ratio of the exhaust gas flowing into the first catalyst is the lean air fuel ratio, oxygen is stored in the first catalyst, and when the air fuel ratio of the exhaust gas flowing into the first catalyst is the rich air fuel ratio, oxygen is released from the first catalyst. For this reason, even if the air fuel ratio of the exhaust gas flowing into the first catalyst is the lean air fuel ratio, but in cases where the first catalyst is able to store oxygen, the air fuel ratio of the exhaust gas flowing out from the first catalyst can be the stoichiometric air fuel ratio. On the other hand, even if the air fuel ratio of the exhaust gas flowing into the first catalyst is the rich air fuel ratio, but in cases where the first catalyst is able to release oxygen, the air fuel ratio of the exhaust gas flowing out from the first catalyst can be the stoichiometric air fuel ratio. Then, during the time when the air fuel ratio of the exhaust gas flowing out from the first catalyst is the stoichiometric air fuel ratio, oxygen, HC and CO are hardly supplied to the second catalyst, so there is not produced heat due to oxidation reaction in the second catalyst.

Here, by carrying out the lean control and the rich control in an alternate manner so that the target reference air fuel ratio varies to the rich air fuel ratio and the lean air fuel ratio at a relatively long interval, while making the target air fuel ratio of the internal combustion engine vary to the lean air fuel ratio and the rich air fuel ratio at the relatively short interval, it becomes possible to make the exhaust gas of the lean air fuel ratio containing oxygen and the exhaust gas of the rich air fuel ratio containing HC and CO flow out from the first catalyst in an alternate manner. That is, during the execution of the lean control, the target air fuel ratio of the internal combustion engine varies to the first lean air fuel ratio and the first rich air fuel ratio, but the target reference air fuel ratio is the reference lean air fuel ratio which is a lean-side air fuel ratio from the stoichiometric air fuel ratio, as a result of which the amount of supply of oxygen becomes relatively larger than that of HC and CO, so the amount of oxygen stored in the first catalyst increases. Then, the exhaust gas of the lean air fuel ratio flows out from the first catalyst after a sufficient amount of oxygen has been stored in the first catalyst, so the exhaust gas of the lean air fuel ratio containing oxygen is supplied to the second catalyst. On the other hand, during the execution of the rich control, the target air fuel ratio of the internal combustion engine varies to the second lean air fuel ratio and the second rich air fuel ratio, but the target reference air fuel ratio is the reference rich air fuel ratio which is a rich-side air fuel ratio from the stoichiometric air fuel ratio, as a result of which the amount of supply of HC and CO becomes relatively larger than that of oxygen, so the amount of oxygen stored in the first catalyst decreases. Then, the exhaust gas of the rich air fuel ratio flows out from the first catalyst after a sufficient amount of oxygen has been released from the first catalyst, so the exhaust gas of the rich air fuel ratio containing HC and CO is supplied to the second catalyst. Accordingly, by carrying out the lean control and the rich control in an alternate manner, it becomes possible to supply the exhaust gas of the lean air fuel ratio containing oxygen and the exhaust gas of the rich air fuel ratio containing HC and CO to the second catalyst in an alternate manner. As a result, the temperature of the second catalyst can be raised in a quick manner.

However, when the target air fuel ratio of the internal combustion engine becomes the first lean air fuel ratio during the execution of the lean control, the degree of leanness of the air fuel ratio may become too large. Here, in the first catalyst and the second catalyst, when the air fuel ratio is lean, the larger the leanness thereof, i.e., the leaner the air fuel ratio is than the stoichiometric air fuel ratio (the larger the air fuel ratio is than the stoichiometric air fuel ratio), the purification (reduction) rate of NOx will drop or decrease. Accordingly, when the target air fuel ratio of the internal combustion engine becomes the first lean air fuel ratio during the execution of the lean control, the leanness of the air fuel ratio may become too large in the first catalyst and the second catalyst, thus making it difficult to remove or reduce NOx. Here, note that in this description, in cases where the air fuel ratio becomes larger, it is indicated that the concentration of fuel becomes lower, and in cases where the air fuel ratio becomes smaller, it is indicated that the concentration of fuel becomes higher. In addition, in this description, the lean air fuel ratio indicates an air fuel ratio larger than the stoichiometric air fuel ratio, and the rich air fuel ratio indicates an air fuel ratio smaller than the stoichiometric air fuel ratio.

In contrast to this, the controller controls the target air fuel ratio in such a manner that the degree of leanness of the fuel air ratio is made small at the time when the target air fuel ratio is the first lean air fuel ratio during the execution of the lean control. That is, when the target air fuel ratio is made to vary during the execution of the lean control, the degree of leanness of the air fuel ratio is made small by making a deviation of the target air fuel ratio from the reference lean air fuel ratio smaller at the time of the first lean air fuel ratio than at the time of the first rich air fuel ratio. In addition, in order to adjust the reference lean air fuel ratio to an air fuel ratio which is suitable for the temperature rise of the second catalyst, when the target air fuel ratio is made to vary, the period per one time in which the target air fuel ratio becomes the first lean air fuel ratio is made longer than a period per one time in which the target air fuel ratio becomes the first rich air fuel ratio. That is, during the execution of the lean control, when the target air fuel ratio is the first lean air fuel ratio, the deviation of the target air fuel ratio from the reference lean air fuel ratio becomes smaller, and the duration time of the target air fuel ratio becomes longer, than when the target air fuel ratio is the first rich air fuel ratio. Thus, the degree of leanness of the air fuel ratio at the time of the target air fuel ratio being the first lean air fuel ratio can be made small, while adjusting the reference lean air fuel ratio to the suitable air fuel ratio for the temperature rise of the second catalyst, and hence, it is possible to suppress the reduction of NOx by the second catalyst from becoming difficult.

In addition, when making said target air fuel ratio vary in the case of carrying out said rich control, said controller can make a period per one time in which said target air fuel ratio becomes said second rich air fuel ratio longer than a period per one time in which said target air fuel ratio becomes said second lean air fuel ratio, and can make a deviation of said second rich air fuel ratio from said reference rich air fuel ratio smaller than a deviation of said second lean air fuel ratio from said reference rich air fuel ratio.

When the target air fuel ratio of the internal combustion engine becomes the second rich air fuel ratio during the execution of the rich control, the degree of richness of the air fuel ratio may become too large. Here, in the first catalyst and the second catalyst, when the air fuel ratio is rich, the larger the richness thereof, i.e., the richer the air fuel ratio is than the stoichiometric air fuel ratio (i.e., the smaller the air fuel ratio is than the stoichiometric air fuel ratio), the purification (oxidation) rates of HC and CO will drop or decrease. Accordingly, when the target air fuel ratio of the internal combustion engine becomes the second rich air fuel ratio during the execution of the rich control, the richness of the air fuel ratio may become too large in the first catalyst and the second catalyst, thus making it difficult to oxidize HC and CO.

In contrast to this, the controller may also control the target air fuel ratio in such a manner that the degree of richness of the fuel air ratio is made small at the time when the target air fuel ratio is the second rich air fuel ratio during the execution of the rich control. That is, when the target air fuel ratio is made to vary during the execution of the rich control, the degree of richness of the air fuel ratio may be made small by making a deviation of the target air fuel ratio from the reference rich air fuel ratio smaller at the time of the second rich air fuel ratio than at the time of the second lean air fuel ratio. In addition, in order to adjust the reference rich air fuel ratio to an air fuel ratio which is suitable for the temperature rise of the second catalyst, when the target air fuel ratio may be made to vary, the period per one time in which the target air fuel ratio becomes the second rich air fuel ratio is made longer than a period per one time in which the target air fuel ratio becomes the second lean air fuel ratio. In this case, during the execution of the rich control, when the target air fuel ratio is the second rich air fuel ratio, the deviation of the target air fuel ratio from the reference rich air fuel ratio becomes smaller, and the duration time of the target air fuel ratio becomes longer, than when the target air fuel ratio is the second lean air fuel ratio. Thus, the degree of richness of the air fuel ratio at the time of the target air fuel ratio being the second rich air fuel ratio can be made small, while adjusting the reference rich air fuel ratio to the suitable air fuel ratio for the temperature rise of the second catalyst, and hence, it is possible to suppress the oxidation of HC and CO by the second catalyst from becoming difficult.

Moreover, when carrying out said lean control and said rich control in an alternate manner, said controller can first carry out the execution of said rich control.

In the second catalyst, as mentioned above, at the time of the lean air fuel ratio, the larger the degree of leanness of the air fuel ratio, i.e., the higher the air fuel ratio rises, the more the purification (reduction) rate of NOx decreases. In addition, the second catalyst, at the time of the rich air fuel ratio, the larger the degree of richness of the air fuel ratio, i.e., the lower the air fuel ratio drops, the more the purification (oxidation) rates of HC and CO decrease. Then, an amount of decrease of the purification (reduction) rate of NOx with respect to an amount of rise of the air fuel ratio tends to be larger than an amount of decrease of each of the purification (oxidation) rates of HC and CO with respect to an amount of drop of the air fuel ratio. That is, it can be said that in the second catalyst, the amount of decrease of the purification rate with respect to an amount of change of the air fuel ratio is larger in the case where the second catalyst becomes the lean air fuel ratio during the execution of the lean control than in the case where the second catalyst becomes the rich air fuel ratio during the execution of the rich control. Accordingly, in the case of carrying out the rich control and the lean control in an alternate manner, the controller may first carry out the rich control, and then the lean control, in order that the frequency or number of times of carrying out the lean control may become as small as possible. Here, in the case of carrying out the rich control and the lean control repeatedly in an alternate manner, the rich control and the lean control may be carried out the same number of times, or either one control may be carried out a number of times less by one than the other. Then, by carrying out the rich control first, the number of times at which the lean control is carried out can be made smaller by one in some cases. That is, when starting with the rich control and ending with the rich control, the number of times of the lean control will be smaller by one than that of the rich control. Then, because the number of times of the lean control becomes smaller by one, the rich control and the lean control may be able to be ended before the oxygen in the second catalyst becomes excessive. Even in cases where the oxygen in the second catalyst becomes excessive when the rich control and the lean control are carried out in a repeated manner, if they are ended with the rich control and thereafter the lean control is not carried out, it will be able to decrease the amount of NOx flowing out from the second catalyst by an amount of NOx which should have flowed out from the second catalyst in the lean control. In this manner, a decrease in the reduction rate of NOx can be suppressed.

Further, when carrying out said lean control and said rich control in an alternate manner, said controller can first carry out said rich control, and when making said target air fuel ratio vary in the case of carrying out said rich control at least first time, said controller can make a period per one time in which said target air fuel ratio becomes said second rich air fuel ratio longer than a period per one time in which said target air fuel ratio becomes said second lean air fuel ratio, and make a deviation of said second rich air fuel ratio from said reference rich air fuel ratio smaller than a deviation of said second lean air fuel ratio from said reference rich air fuel ratio, wherein said at least first rich control can be carried out until the release of oxygen stored in said second catalyst is completed.

As mentioned above, the amount of NOx flowing out from the second catalyst can be decreased by first carrying out the rich control. In addition, as mentioned above, in cases where the rich control is carried out, by making the period per one time in which the target air fuel ratio becomes the second rich air fuel ratio longer than the period per one time in which the target air fuel ratio becomes the second lean air fuel ratio, and making the deviation of the target air fuel ratio from the reference rich air fuel ratio smaller at the time of the second rich air fuel ratio than at the time of the second lean air fuel ratio, the degree of richness of the target air fuel ratio can be made small, thus making it possible to suppress the oxidation of HC and CO by the second catalyst from becoming difficult. Further, in the at least first rich control, by carrying out the rich control until the release of oxygen stored in the second catalyst is completed, the storage amount of oxygen in the second catalyst is reset, and hence, after that, the amount of oxygen stored in the second catalyst can be grasped with a higher degree of accuracy. For this reason, even if the lean control is thereafter carried out, it is possible to suppress the NOx reduction rate of the second catalyst from decreasing due to excessive oxygen. As a result of this, it is possible to suppress a decrease in the reduction rate of NOx.

In addition, when starting said lean control, said controller can first make said target air fuel ratio to be said first rich air fuel ratio or when starting said rich control, said controller can first make said target air fuel ratio to be said second rich air fuel ratio.

As mentioned above, when the air fuel ratio in the second catalyst is lean, the larger the degree of leanness thereof, the more the reduction rate of NOx decreases, so the amount of NOx flowing out from the second catalyst can be decreased by making the degree of leanness smaller. Here, when the target air fuel ratio is made to vary to the lean air fuel ratio and the rich air fuel ratio, in the case where the target air fuel ratio is first made to be the rich air fuel ratio, the number of times at which the target air fuel ratio becomes the lean air fuel ratio may be smaller by one than that at which the target air fuel ratio becomes the rich air fuel ratio, as compared with the case where the target air fuel ratio is first made to be the lean air fuel ratio. Then, when the target air fuel ratio is made to vary to the lean air fuel ratio and the rich air fuel ratio, in the case where the storage amount of oxygen in the second catalyst increases gradually so that oxygen can become excessive, the number of times at which the target air fuel ratio becomes the lean air fuel ratio will be smaller by one, as a result of which the rich control or the lean control may be able to be ended before oxygen becomes excessive. In this case, it is possible to suppress NOx from flowing out from the second catalyst. In addition, even in cases where the oxygen in the second catalyst becomes excessive when the target air fuel ratio varies between the rich side and the lean side across the stoichiometric air fuel ratio, if the control is terminated at the time when the air fuel ratio becomes the rich air fuel ratio and if thereafter the air fuel ratio does not become the lean air fuel ratio, it will be able to decrease the amount of NOx flowing out from the second catalyst by an amount of NOx which would have flowed out from the second catalyst when the air fuel ratio would become the lean air fuel ratio. In this manner, the decrease in the reduction rate of NOx can be suppressed.

Moreover, said controller can make said reference rich air fuel ratio at an end point in time of said rich control leaner than that at a start point in time thereof.

In that case, during the rich control is carried out, the reference rich air fuel ratio becomes larger within the range of the rich air fuel ratio when the amount of oxygen stored in the second catalyst is small than when it is large. During the rich control, the purification (oxidation) rates of HC and CO become higher, as the reference rich air fuel ratio becomes larger. Accordingly, the concentrations of HC and CO at the downstream side of the second catalyst can be made low.

Further, said controller can make said reference lean air fuel ratio at an end point in time of said lean control richer than that at a start point in time thereof.

In that case, during the lean control is carried out, the reference lean air fuel ratio becomes smaller within the range of the lean air fuel ratio when the amount of oxygen stored in the second catalyst is large than when it is small. During the lean control, the reduction rate of NOx becomes higher, as the reference lean air fuel ratio becomes smaller.

Accordingly, the concentration of NOx at the downstream side of the second catalyst can be made low.

Advantageous Effects

According to the present disclosure, in cases where catalysts are arranged at an upstream side portion and at a downstream side portion of an exhaust passage in an internal combustion engine, it is possible to decrease the substances flowing out without being removed (reduced or oxidized) by a downstream side catalyst, when the temperature of the downstream side catalyst is raised.

DETAILED DESCRIPTION

Hereinafter, the modes for carrying out the present disclosure will be exemplarily described in detail based on embodiments with reference to the attached drawings. However, the dimensions, materials, shapes, relative arrangements and so on of component parts described in the embodiments are not intended to limit the scope of the present disclosure to these alone in particular as long as there are no specific statements.

First Embodiment

Figure 1:
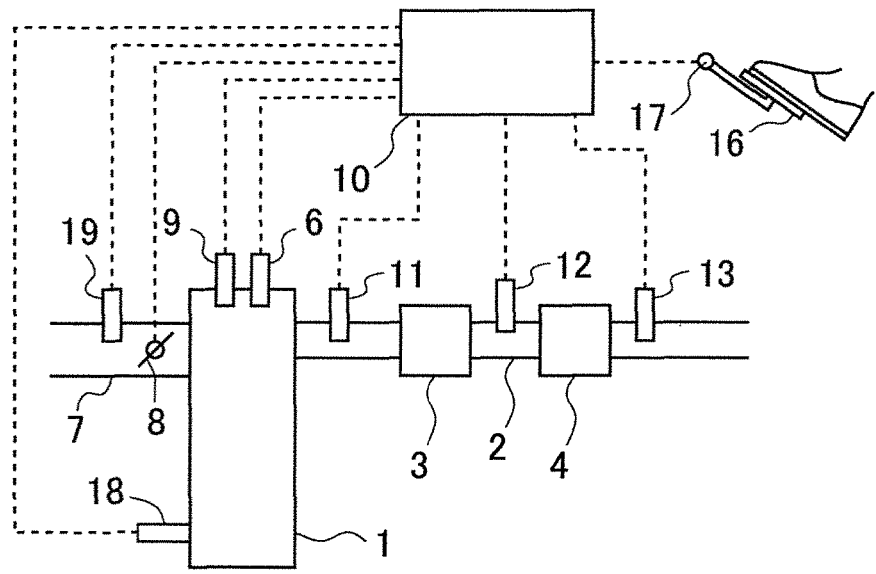
FIG. 1 is a view showing the schematic construction of an internal combustion engine as well as its intake and exhaust systems according to embodiments of the present disclosure.

FIG. 1 is a view showing the schematic construction of an internal combustion engine 1 as well as its intake and exhaust systems according to embodiments of the present disclosure. The internal combustion engine 1 shown in FIG. 1 is a gasoline engine. The internal combustion engine 1 is installed on a vehicle, for example. An exhaust passage 2 is connected to the internal combustion engine 1. In the middle of the exhaust passage 2, a first catalyst 3 in the form of a three-way catalyst and a second catalyst 4 also in the form of a three-way catalyst are sequentially arranged in this order from an upstream side.

The first catalyst 3 and the second catalyst 4 serve to purify (reduce or oxidize) NOx, HC and CO at the time when a catalytic atmosphere therein is at a stoichiometric air fuel ratio or therearound. The first catalyst 3 and the second catalyst 4 have oxygen occlusion or storage abilities. That is, they occlude or store oxygen when the air fuel ratio of exhaust gas is a lean air fuel ratio, and releases oxygen when the air fuel ratio of exhaust gas is a rich air fuel ratio.

A first air fuel ratio sensor 11 for measuring the air fuel ratio of the exhaust gas is mounted on the exhaust passage 2 at a location upstream of the first catalyst 3. In addition, a second air fuel ratio sensor 12 for detecting the air fuel ratio of the exhaust gas is mounted on the exhaust passage 2 at a location downstream of the first catalyst 3 and upstream of the second catalyst 4. Moreover, a third air fuel ratio sensor 13 for measuring the air fuel ratio of the exhaust gas is mounted on the exhaust passage 2 at a location downstream of the second catalyst 4.

In addition, on the internal combustion engine 1, there is mounted a fuel injection valve 6 for supplying fuel to the internal combustion engine 1. Further, on the internal combustion engine 1, there is mounted a spark plug 9 for generating an electric spark in each cylinder. Moreover, an intake passage 7 is connected to the internal combustion engine 1. A throttle valve 8 for regulating the amount of intake air in the internal combustion engine 1 is arranged in the middle of the intake passage 7. An air flow meter 19 for detecting the amount of intake air in the internal combustion engine 1 is mounted on the intake passage 7 at a location upstream of the throttle valve 8.

In the internal combustion engine 1 constructed as stated above, there is arranged in combination therewith an ECU 10 which is an electronic control unit (controller) for controlling the internal combustion engine 1. This ECU 10 controls the internal combustion engine 1 in accordance with the operating conditions of the internal combustion engine 1 and/or driver's requirements. Besides the above-mentioned sensors, an accelerator opening sensor 17, which serves to detect an engine load by outputting an electrical signal corresponding to an amount by which a driver depressed an accelerator pedal 16, and a crank position sensor 18, which serves to detect an engine rotational speed, are connected to the ECU 10 through electrical wiring, and the output signals of these various kinds of sensors are inputted to the ECU 10. On the other hand, the fuel injection valve 6, the throttle valve 8 and the spark plug 9 are connected to the ECU 10 through electrical wiring, so that these parts are controlled by means of the ECU 10.

The ECU 10 sets a target air fuel ratio based on the operating state of the internal combustion engine 1 (e.g., the engine rotational speed and the accelerator opening degree). Then, the ECU 10 controls the throttle valve 8 and the injection valve 6 in such a manner that an actual air fuel ratio becomes the target air fuel ratio. Here, note that in the internal combustion engine 1 according to this first embodiment, a lean burn operation (i.e., an operation at a lean air fuel ratio) is carried out. However, at such a time as cold start of the internal combustion engine 1, high load operation, temperature rise control to be described later, etc., the operation of the internal combustion engine 1 may be carried out at the stoichiometric air fuel ratio or below.

The ECU 10 carries out the temperature rise control which is to raise the temperatures of the first catalyst 3 and the second catalyst 4. In the temperature rise control, rich control and lean control are carried out in an alternate manner. Here, the rich control is to make the target air fuel ratio of the internal combustion engine 1 vary to the lean air fuel ratio and the rich air fuel ratio by setting a target reference air fuel ratio, which is a target mean value of the target air fuel ratio of the internal combustion engine 1, to a reference rich air fuel ratio which is an air fuel ratio at a side richer than the stoichiometric air fuel ratio, and the lean control is to make the target air fuel ratio of the internal combustion engine 1 vary to the lean air fuel ratio and the rich air fuel ratio by setting the target reference air fuel ratio of the internal combustion engine 1 to a reference lean air fuel ratio which is an air fuel ratio at a side leaner than the stoichiometric air fuel ratio. Here, note that in this embodiment, the target air fuel ratio of the internal combustion engine 1 may be made to vary to the lean air fuel ratio and the rich air fuel ratio, so that a mean air fuel ratio in a period of time in which the lean control is carried out becomes the reference lean air fuel ratio. In addition, in this embodiment, the target air fuel ratio of the internal combustion engine 1 may be made to vary to the lean air fuel ratio and the rich air fuel ratio, so that a mean air fuel ratio in a period of time in which the rich control is carried out becomes the reference rich air fuel ratio. Moreover, in this embodiment, at the time of the lean control or the rich control, the target air fuel ratio of the internal combustion engine 1 may be made to vary to the lean air fuel ratio and the rich air fuel ratio, so that a mean air fuel ratio in a period of time, which is a sum of one period of time for the rich air fuel ratio and one period of time for the lean air fuel ratio which is adjacent to the one period of time for the rich air fuel ratio, becomes the reference lean air fuel ratio or the reference rich air fuel ratio. The temperature rise control is carried out by the ECU 10 adjusting the amount of fuel to be injected from the injection valve 6 and the degree of opening of the throttle valve 8.

Figure 2:
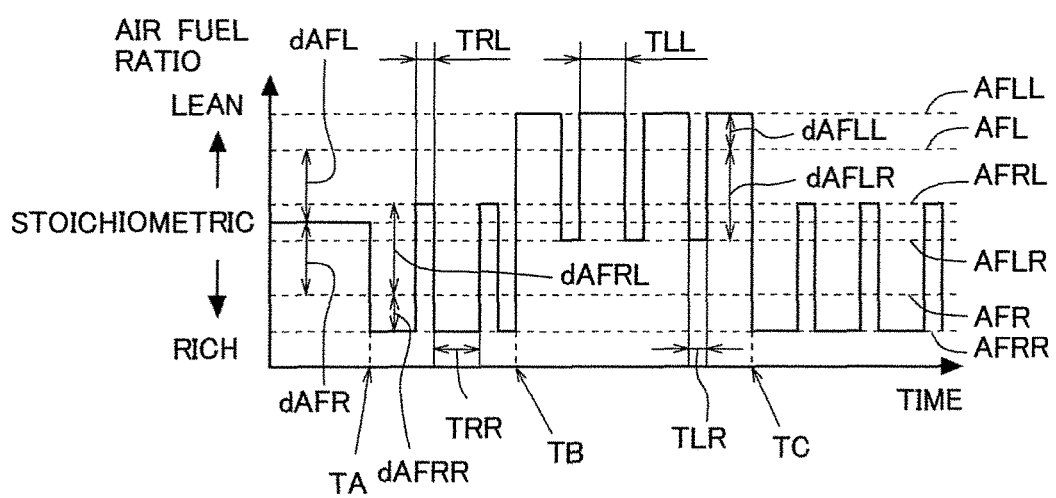
FIG. 2 is a time chart showing the change over time of a target air fuel ratio of the internal combustion engine when temperature rise control according to a first embodiment is carried out.

FIG. 2 is a time chart showing the change over time of the target air fuel ratio of the internal combustion engine 1 when the temperature rise control according to the first embodiment is carried out. In FIG. 2, AFR indicates the reference rich air fuel ratio; AFRR indicates a target air fuel ratio when the target air fuel ratio of the internal combustion engine 1 at the time of the rich control is an air fuel ratio at the side richer than the stoichiometric air fuel ratio (i.e., a rich air fuel ratio at the time of the rich control or a rich-control time rich air fuel ratio); AFRL indicates a target air fuel ratio when the target air fuel ratio of the internal combustion engine 1 at the time of the rich control is at the side leaner than the stoichiometric air fuel ratio (i.e., a lean air fuel ratio at the time of the rich control or a rich-control time lean air fuel ratio); AFL indicates the reference lean air fuel ratio; AFLL indicates a target air fuel ratio when the target air fuel ratio of the internal combustion engine 1 at the time of the lean control is at the side leaner than the stoichiometric air fuel ratio (i.e., a lean air fuel ratio at the time of the lean control or a lean-control time lean air fuel ratio); and AFLR indicates a target air fuel ratio when the target air fuel ratio of the internal combustion engine 1 at the time of the lean control is at the side richer than the stoichiometric air fuel ratio (i.e., a rich air fuel ratio at the time of the lean control or a lean-control time rich air fuel ratio). In addition, TA is a point in time at which the temperature rise control is started and at the same time first rich control is started; TB is a point in time at which the first rich control is terminated and at the same time first lean control is started; and TC is a point in time at which the first lean control is terminated and at the same time second rich control is started. Here, note that in this embodiment, the lean air fuel ratio at the time of the lean control corresponds to a first lean air fuel ratio in the present disclosure; the rich air fuel ratio at the time of the lean control corresponds to a first rich air fuel ratio in the present disclosure; the lean air fuel ratio at the time of the rich control corresponds to a second lean air fuel ratio in the present disclosure; and the rich air fuel ratio at the time of the rich control corresponds to a second rich air fuel ratio in the present disclosure.

In addition, in FIG. 2, dAFR indicates a deviation of the reference rich air fuel ratio AFR from the stoichiometric air fuel ratio at the time of the rich control (i.e., a reference deviation at the time of the rich control); and dAFL indicates a deviation of the reference lean air fuel ratio AFL from the stoichiometric air fuel ratio at the time of the lean control (i.e., a reference deviation at the time of the lean control). Moreover, dAFRL indicates a deviation of the target air fuel ratio of the internal combustion engine 1 from the reference rich air fuel ratio AFR when the target air fuel ratio at the time of the rich control is the rich-control time lean air fuel ratio AFRL (i.e., a lean deviation at the time of the rich control); dAFRR indicates a deviation of the target air fuel ratio of the internal combustion engine 1 from the reference rich air fuel ratio AFR when the target air fuel ratio at the time of the rich control is the rich-control time rich air fuel ratio AFRR (i.e., a rich deviation at the time of the rich control); dAFLL indicates a deviation of the target air fuel ratio of the internal combustion engine 1 from the reference lean air fuel ratio AFL when the target air fuel ratio at the time of the lean control is the lean-control time lean air fuel ratio AFLL (i.e., a lean deviation at the time of the lean control); and dAFLR indicates a deviation of the target air fuel ratio of the internal combustion engine 1 from the reference lean air fuel ratio AFL when the target air fuel ratio at the time of the lean control is the lean-control time rich air fuel ratio AFLR (i.e., a rich deviation at the time of the lean control).

Further, in FIG. 2, TRR indicates a period of time per one time for which the rich-control time rich air fuel ratio AFRR continues at one time when the target air fuel ratio of the internal combustion engine 1 at the time of the rich control is the rich-control time rich air fuel ratio AFRR (i.e., a rich period of time at the time of the rich control); TRL indicates a period of time per one time for which the rich-control time lean air fuel ratio AFRL continues at one time when the target air fuel ratio of the internal combustion engine 1 at the time of the rich control is the rich-control time lean air fuel ratio AFRL (i.e., a lean period of time at the time of the rich control); TLL indicates a period of time per one time for which the lean-control time lean air fuel ratio AFLL continues at one time when the target air fuel ratio of the internal combustion engine 1 at the time of the lean control is the lean-control time lean air fuel ratio AFLL (i.e., a lean period of time at the time of the lean control); and TLR indicates a period of time per one time for which the lean-control time rich air fuel ratio AFLR continues at one time when the target air fuel ratio of the internal combustion engine 1 at the time of the lean control is the lean-control time rich air fuel ratio AFLR (i.e., a rich period of time at the time of the lean control).

In the temperature rise control according to this embodiment, the target air fuel ratio of the internal combustion engine 1 is controlled so that at the time of the rich control, the rich deviation dAFRR at the time of the rich control becomes smaller than the lean deviation dAFRL at the time of the rich control, and the rich period of time TRR at the time of the rich control becomes longer than the lean period of time TRL at the time of the rich control. In addition, in the temperature rise control according to this embodiment, the target air fuel ratio of the internal combustion engine 1 is controlled so that at the time of the lean control, the lean deviation dAFLL at the time of the lean control becomes smaller than the rich deviation dAFLR at the time of the lean control, and the lean period of time TLL at the time of the lean control becomes longer than the rich period of time TLR at the time of the lean control.

Here, the rich-control time lean air fuel ratio AFRL is leaner than the stoichiometric air fuel ratio, so even when the rich control is carried out, exhaust gas of the lean air fuel ratio temporarily flows into the first catalyst 3. For this reason, during the rich control, when the air fuel ratio is made to vary to the rich-control time rich air fuel ratio AFRR and the rich-control time lean air fuel ratio AFRL, exhaust gas of the rich air fuel ratio containing HC and CO can be supplied to the first catalyst 3 at the time of the rich-control time rich air fuel ratio AFRR, and exhaust gas of the lean air fuel ratio containing oxygen can be supplied to the first catalyst 3 at the time of the rich-control time lean air fuel ratio AFRL. Accordingly, during the execution of the rich control, the exhaust gas of the rich air fuel ratio containing HC and CO and the exhaust gas of the lean air fuel ratio containing oxygen are supplied to the first catalyst 3 in an alternate manner, so that the HC and CO are oxidized in the first catalyst 3. With this, mainly, the temperature of the first catalyst 3 can be raised.

In addition, the lean-control time rich air fuel ratio AFLR is richer than the stoichiometric air fuel ratio, so that even at the time of the lean control, the exhaust gas of the rich air fuel ratio temporarily flows into the first catalyst 3. For this reason, during the lean control, when the air fuel ratio is made to vary to the lean-control time lean air fuel ratio AFLL and the lean-control time rich air fuel ratio AFLR, the exhaust gas of the rich air fuel ratio containing HC and CO can be supplied to the first catalyst 3 at the time of the lean-control time rich air fuel ratio AFLR, and the exhaust gas of the lean air fuel ratio containing oxygen can be supplied to the first catalyst 3 at the time of the lean-control time lean air fuel ratio AFLL. Accordingly, during the execution of the lean control, the exhaust gas of the rich air fuel ratio containing HC and CO and the exhaust gas of the lean air fuel ratio containing oxygen are also supplied to the first catalyst 3 in an alternate manner, so that the HC and CO are oxidized in the first catalyst 3. As a result of this, mainly, the temperature of the first catalyst 3 can be raised. Here, note that due to the rise in the temperature of the exhaust gas flowing out from the first catalyst 3, the temperature of the second catalyst 4 also goes up to some extent.

As described above, whether at the time of the rich control or at the time of the lean control, the temperature of the first catalyst 3 can be raised by making the target air fuel ratio of the internal combustion engine 1 vary to the rich air fuel ratio and the lean air fuel ratio. Here, by oxidizing HC and CO in the first catalyst 3, the temperature of the second catalyst 4 can be raised to some extent, but with this alone, in the exhaust passage 2 extending from the first catalyst 3 to the second catalyst 4, heat will be released to the outside of the exhaust passage 2, and hence, large amounts of HC and CO are required in order to raise the temperature of the second catalyst 4, and a considerable time is also required for a sufficient rise in the temperature of the second catalyst 4. On the other hand, if heat can be produced in the second catalyst 4 by oxidizing HC and CO in the second catalyst 4, it is possible to suppress the heat from being released to the outside of the exhaust passage 2, and to raise the temperature of the second catalyst 4 in a quick manner.

Accordingly, the rich control in this embodiment is carried out at least until the exhaust gas of the rich air fuel ratio flows out from the first catalyst 3, and the lean control is carried out at least until the exhaust gas of the lean air fuel ratio flows out from the first catalyst 3. That is, at the time of the rich control, the exhaust gas of the rich air fuel ratio flows out from the first catalyst 3, so the exhaust gas of the rich air fuel ratio containing HC and CO can be supplied to the second catalyst 4. In addition, at the time of the lean control, the exhaust gas of the lean air fuel ratio flows out from the first catalyst 3, so the exhaust gas of the lean air fuel ratio containing oxygen can be supplied to the second catalyst 4. Accordingly, by carrying out the rich control and the lean control in an alternate manner, the exhaust gas of the rich air fuel ratio containing HC and CO and the exhaust gas of the lean air fuel ratio containing oxygen are supplied to the second catalyst 4 in an alternate manner, so that the HC and CO are oxidized in the second catalyst 4. As a result of this, the temperature of the second catalyst 4 can be raised. Thus, by carrying out the rich control and the lean control in an alternate manner, the temperature of the second catalyst 4 goes up quickly.

Here, when the target air fuel ratio of the internal combustion engine 1 becomes the rich-control time rich air fuel ratio AFRR during the rich control, the degree of richness of the air fuel ratio becomes relatively large. For this reason, the oxygen stored in the first catalyst 3 and the second catalyst 4 is released quickly. In that case, oxygen may run short in the second catalyst 4, so that purification or oxidation of HC and CO may become difficult, thus giving rise to a fear that HC and CO may flow out from the second catalyst 4. In addition, when the target air fuel ratio of the internal combustion engine 1 becomes the lean-control time lean air fuel ratio AFLL during the lean control, the degree of leanness of the air fuel ratio becomes relatively large. For this reason, oxygen is quickly stored into the first catalyst 3 and the second catalyst 4. In that case, oxygen may become excessive in the second catalyst 4, so that purification or reduction of NOx may become difficult, thus giving rise to a fear that NOx may flow out from the second catalyst 4. Accordingly, the lean-control time lean air fuel ratio AFLL is desirable to be smaller, and the rich-control time rich air fuel ratio AFRR is desirable to be larger.

Accordingly, in this embodiment, the rich-control time rich air fuel ratio AFRR is made large by adjusting the air fuel ratio in such a manner that the rich deviation dAFRR at the time of the rich control becomes smaller than the lean deviation dAFRL at the time of the rich control. With this, the degree of richness of the rich-control time rich air fuel ratio AFRR can be made small. However, only by making small the degree of richness of the rich-control time rich air fuel ratio AFRR, the reference rich air fuel ratio AFR will become larger than an originally intended air fuel ratio suitable for raising the temperature of the second catalyst 4. In that case, a considerable time will be required for raising the temperature of the second catalyst 4. For this reason, by making the rich period of time TRR at the time of the rich control longer than the lean period of time TRL at the time of the rich control, the reference rich air fuel ratio AFR is adjusted to the originally intended air fuel ratio suitable for raising the temperature of the second catalyst 4.

Similarly, in this embodiment, the lean-control time lean air fuel ratio AFLL is made small by adjusting the air fuel ratio in such a manner that the lean deviation dAFLL at the time of the lean control becomes smaller than the rich deviation dAFLR at the time of the lean control. With this, the degree of leanness of the lean-control time lean air fuel ratio AFLL can be made small. However, only by making small the degree of leanness of the lean-control time lean air fuel ratio AFLL, the reference lean air fuel ratio AFL will become smaller than the originally intended air fuel ratio suitable for raising the temperature of the second catalyst 4. In that case, a considerable time will be required for raising the temperature of the second catalyst 4. For this reason, by making the lean period of time TLL at the time of the lean control longer than the rich period of time TLR at the time of the lean control, the reference lean air fuel ratio AFL is adjusted to the originally intended air fuel ratio suitable for raising the temperature of the second catalyst 4.

Figure 3:
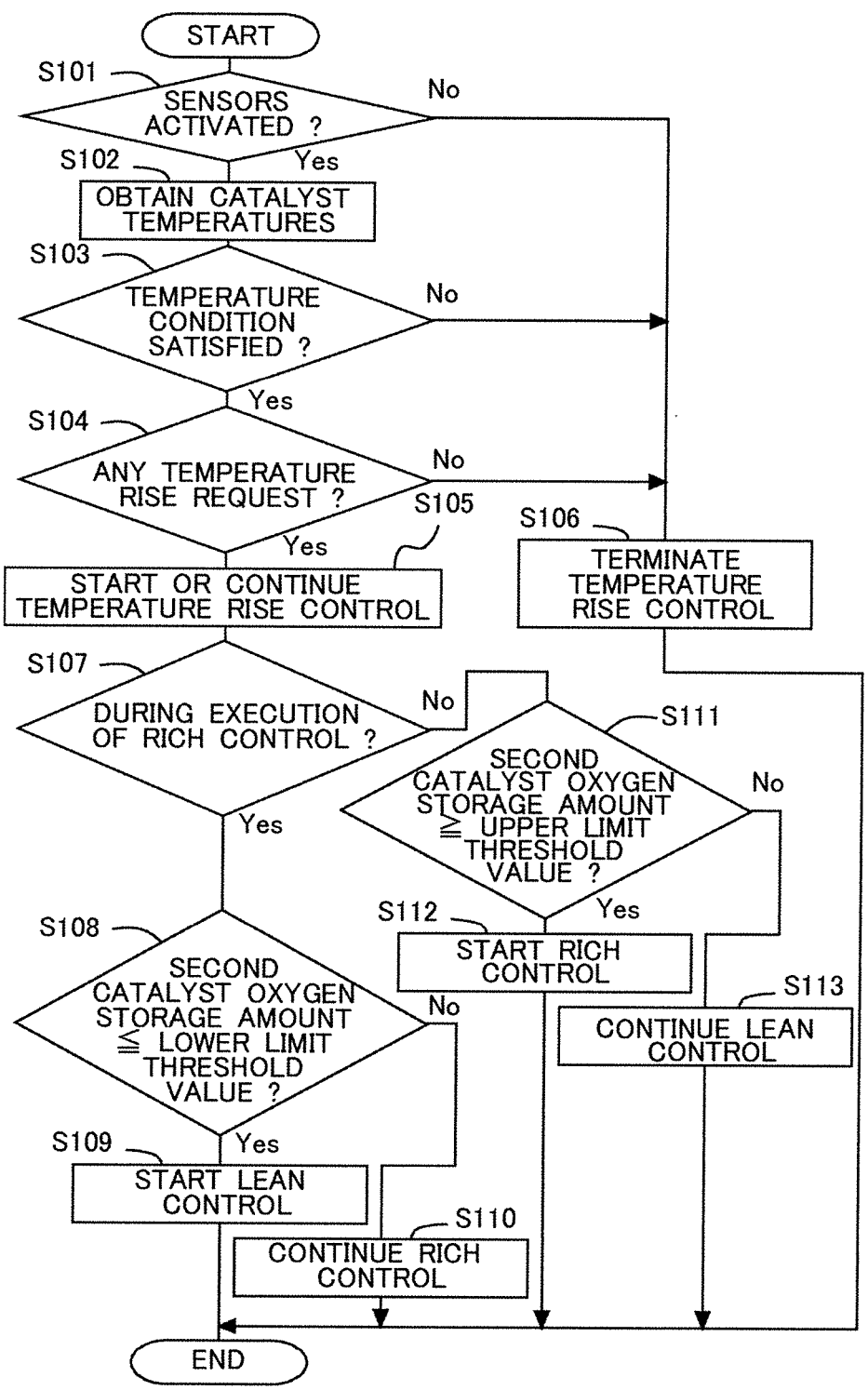
FIG. 3 is a flow chart showing a flow for the temperature rise control according to the first embodiment.

FIG. 3 is a flow chart showing a flow or routine for the temperature rise control according to this embodiment. The routine in this flow chart is carried out by means of the ECU 10 at each predetermined time interval.

In step S101, it is determined whether air fuel ratio sensors used in the temperature rise control have been activated. In the temperature rise control according to this flow chart, the detected values of the first air fuel ratio sensor 11 and the second air fuel ratio sensor 12 are used, as will be described later. Accordingly, in this step S101, it is determined whether the first air fuel ratio sensor 11 and the second air fuel ratio sensor 12 have been activated. In cases where the first air fuel ratio sensor 11 and the second air fuel ratio sensor 12 have each reached an activation temperature, a determination is made that both of the sensors have been activated. Here, the first air fuel ratio sensor 11 and the second air fuel ratio sensor 12 are provided with heaters for heating the sensors, respectively. For example, in cases where a sufficient period of time has elapsed after starting electrical energization to the heaters for heating the sensors, it is assumed that both of the sensors have each reached the activation temperature. This sufficient period of time can be obtained in advance through experiments, simulations, or the like. In cases where an affirmative determination is made in step S101, the routine goes to step S102, whereas in cases where a negative determination is made, the routine goes to step S106.

In step S102, the temperatures of the first catalyst 3 and the second catalyst 4 are obtained. The temperatures of the first catalyst 3 and the second catalyst 4 may be estimated by the ECU 10, or may be measured by temperature sensors which are mounted on the individual catalysts or the exhaust passage 2, respectively.

In step S103, it is determined whether a temperature condition for carrying out the temperature rise control is satisfied. In this step S103, it is determined whether the first catalyst 3 and the second catalyst 4 are in a state where they will not be overheated, even if the temperature rise control is carried out. Specifically, it is determined whether both the temperatures of the first catalyst 3 and the second catalyst 4 are each equal to or less than a temperature (e.g., 800 degrees C.) at which they may not be overheated. In cases where an affirmative determination is made in step S103, the routine goes to step S104, whereas in cases where a negative determination is made, the routine goes to step S106.

In step S104, it is determined whether there is any request for raising the temperature of the second catalyst 4. For example, it is determined whether there is a request for raising the temperature of the second catalyst 4 in order to improve the purification (reduction or oxidation) ability thereof, or in cases where a filter is provided at the downstream side of the second catalyst 4, or in cases where the second catalyst 4 is supported by a filter, it is determined whether there is a request for regenerating such a filter. In cases where an affirmative determination is made in step S104, the routine goes to step S105, whereas in cases where a negative determination is made, the routine goes to step S106.

In step S105, the temperature rise control is started, or in cases where the temperature rise control has already been started, it is continued. That is, in cases where the temperature rise control has not been carried out, the temperature rise control is started, or in cases where the temperature rise control has been carried out, the temperature rise control is continued. In the case of starting the temperature rise control, it is started from the rich control. On the other hand, in step S106, the temperature rise control is terminated. When the processing of step S106 ends, this routine is ended. Here, note that in cases where the temperature rise control has not been carried out at a point in time at which the processing of step S106 is done, this flow or routine is ended without doing anything in step S106.

In step S107, it is determined whether the rich control is being carried out. In cases where an affirmative determination is made in step S107, the routine goes to step S108, whereas in cases where a negative determination is made, the routine goes to step S111. Here, note that the ECU 10 carries out the processing in step S107 and onwards, and thus functions as a controller in the present disclosure.

In step S108, it is determined whether a storage amount of oxygen in the second catalyst 4 is equal to or less than a lower limit threshold value. In this step S108, it is determined whether the storage amount of oxygen in the second catalyst 4 has decreased to a sufficient extent. The storage amounts of oxygen in the individual catalysts can be estimated based on the amount of intake air detected by the air flow meter 19, and the air fuel ratios of the exhaust gases flowing into the individual catalysts, respectively. The air fuel ratios of the exhaust gases flowing into the individual catalysts can be detected by the first air fuel ratio sensor 11 and the second air fuel ratio sensor 12, respectively. The lower limit threshold value is set so as to suppress HC and CO from flowing out from the second catalyst 4 during the execution of the rich control. That is, when the storage amount of oxygen in the second catalyst 4 becomes too small during the rich control, it will become difficult to remove or oxidize HC and CO, so the lower limit threshold value is set in such a manner that the lean control is started before the storage amount of oxygen in the second catalyst 4 becomes too small. Here, note that the lower limit threshold value may also be set in such a manner that the amounts or concentrations of HC and CO flowing out from the second catalyst 4 fall within an allowable range. The lower limit threshold value has been obtained in advance through experiments, simulations or the like.

In cases where an affirmative determination is made in step S108, the routine goes to step S109, where the rich control is terminated and at the same time the lean control is started. That is, the lean control is started in order to supply the exhaust gas of the lean air fuel ratio containing oxygen to the second catalyst 4. By starting the lean control, the target air fuel ratio of the internal combustion engine 1 is made to vary to the lean-control time lean air fuel ratio AFLL and the lean-control time rich air fuel ratio AFLR across the reference lean air fuel ratio AFL. When the processing of step S109 ends, this routine is ended. On the other hand, in cases where a negative determination is made in step S108, the routine goes to step S110, where the rich control is continued. That is, the storage amount of oxygen in the second catalyst 4 is still large, so the exhaust gas of the rich air fuel ratio containing HC and CO is supplied to the second catalyst 4 by continuing the rich control. With this, the HC and CO can be made to react with oxygen, thereby making it possible to raise the temperature of the second catalyst 4. When the processing of step S110 ends, this routine is ended.

On the other hand, in cases where a positive determination is made in step S107, the routine goes to step S111. In step S111, it is determined whether the storage amount of oxygen in the second catalyst 4 is equal to or more than an upper limit threshold value. In this step S111, it is determined whether the storage amount of oxygen in the second catalyst 4 has increased to a sufficient extent. The upper limit threshold value is set so as to suppress NOx from flowing out from the second catalyst 4 during the execution of the lean control. That is, when the storage amount of oxygen in the second catalyst 4 becomes too large during the lean control, it will become difficult to remove or reduce NOx, so the upper limit threshold value is set in such a manner that the rich control is started before the storage amount of oxygen in the second catalyst 4 becomes too large. Here, note that the upper limit threshold value may also be set in such a manner that the concentration of NOx flowing out from the second catalyst 4 falls within an allowable range. The upper limit threshold value has been obtained in advance through experiments, simulations or the like. In cases where an affirmative determination is made in step S111, the routine goes to step S112, where the lean control is terminated and at the same time the rich control is started. By starting the rich control, the target air fuel ratio of the internal combustion engine 1 is made to vary to the rich-control time rich air fuel ratio AFRR and the rich-control time lean air fuel ratio AFRL across the reference rich air fuel ratio AFR. When the processing of step S112 ends, this routine is ended. On the other hand, in cases where a negative determination is made in step S112, the routine goes to step S113, where the lean control is continued. That is, the storage amount of oxygen in the second catalyst 4 is still small, so oxygen is supplied to the second catalyst 4 by continuing the lean control. When the processing of step S113 ends, this routine is ended.

Figure 4:
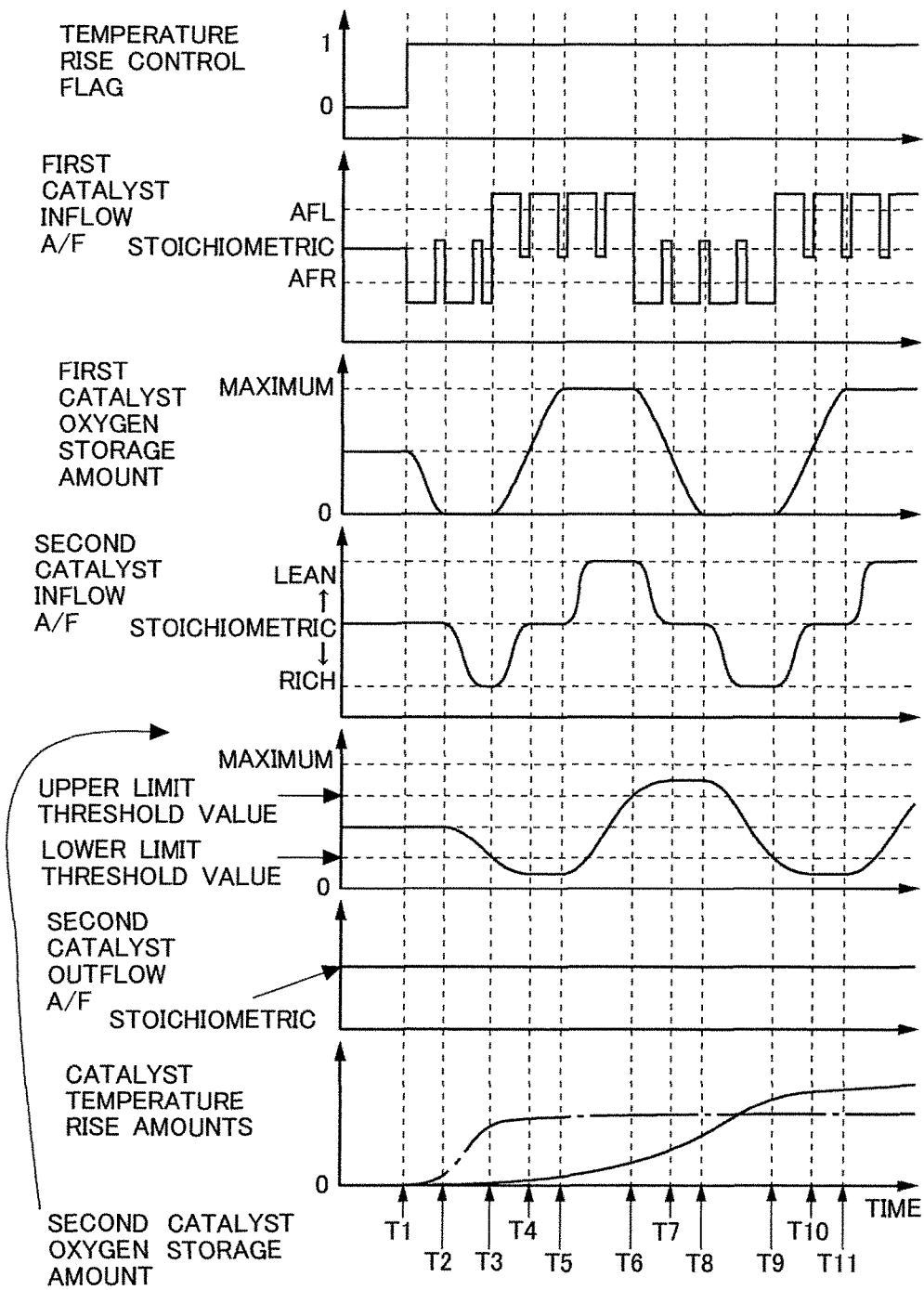
FIG. 4 is a time chart showing the changes over time of a variety of kinds of values when the temperature rise control according to the first embodiment is carried out.

Next, FIG. 4 is a time chart showing the changes over time of a variety of kinds of values when the temperature rise control according to the first embodiment is carried out. In FIG. 4, there are shown, in order from the top to the bottom, a temperature rise control flag, an air fuel ratio of the exhaust gas flowing into the first catalyst 3 (a first catalyst inflow air fuel ratio A/F), a storage amount of oxygen in the first catalyst 3 (a first catalyst oxygen storage amount), an air fuel ratio of the exhaust gas flowing into the second catalyst 4 (a second catalyst inflow air fuel ratio A/F), a storage amount of oxygen in the second catalyst 4 (a second catalyst oxygen storage amount), an air fuel ratio of the exhaust gas flowing out from the second catalyst 4 (a second catalyst outflow air fuel ratio A/F), and amounts of rise in the temperatures of the first catalyst 3 and the second catalyst 4 (catalyst temperature rise amounts). The temperature rise control flag becomes 1 in cases where an affirmative determination is made in step S104, whereas it becomes 0 in cases where a negative determination is made. In the catalyst temperature rise amounts, a solid line indicates an amount of rise in the temperature of the second catalyst 4, whereas an alternate long and short dash line indicates an amount of rise in the temperature of the first catalyst 3.

In FIG. 4, T1 is a point in time at which the temperature rise control flag changes from 0 to 1, and is also a point in time at which the temperature rise control is started. In this embodiment, the rich control is carried out at the time of starting the temperature rise control. T2 is a point in time at which the first catalyst oxygen storage amount becomes 0. Due to the first catalyst oxygen storage amount becoming 0 at T2, the air fuel ratio of the exhaust gas flowing out from the first catalyst 3 changes to the rich air fuel ratio, so the second catalyst inflow air fuel ratio A/F also changes to the rich air fuel ratio. In addition, due to this second catalyst inflow air fuel ratio A/F becoming the rich air fuel ratio, the second catalyst oxygen storage amount begins to decrease.

T3 is a point in time at which the second catalyst oxygen storage amount reaches the lower limit threshold value. In order to change the air fuel ratio of the internal combustion engine 1 to the lean air fuel ratio before the second catalyst oxygen storage amount becomes 0, at T3, the rich control is terminated and changed to the lean control. For this reason, the reference value of the first catalyst inflow air fuel ratio A/F changes from the reference rich air fuel ratio AFR to the reference lean air fuel ratio AFL. According to this, the first catalyst oxygen storage amount begins to increase. In addition, the air fuel ratio of the exhaust gas flowing out from the first catalyst 3 gradually becomes large, so the second catalyst inflow air fuel ratio A/F also gradually becomes large. In a period of time from T1 to T3, the rich control is carried out, and the reference value of the first catalyst inflow air fuel ratio A/F is the reference rich air fuel ratio AFR, but the first catalyst inflow air fuel ratio A/F varies to the rich-control time rich air fuel ratio AFRR and the rich-control time lean air fuel ratio AFRL, so that the exhaust gas of the rich air fuel ratio containing HC and CO and the exhaust gas of the lean air fuel ratio containing oxygen are supplied to the first catalyst 3 in an alternate manner. For this reason, the temperature of the first catalyst 3 goes up. In addition, the rich-control time rich air fuel ratio AFRR, the rich-control time lean air fuel ratio AFRL, the rich period of time TRR at the time of the rich control, and the lean period of time TRL at the time of the rich control have been obtained and set in advance by experiments, simulations or the like, in such a manner that the temperature of the first catalyst 3 may go up quickly and the first catalyst 3 may not be overheated. On the other hand, because the second catalyst inflow air fuel ratio A/F is the stoichiometric air fuel ratio or the rich air fuel ratio, the rise in the temperature of the second catalyst 4 is slow. However, due to the rise in the temperature of the exhaust gas flowing out from the first catalyst 3, the temperature of the second catalyst 4 goes up.

T4 is a point in time at which the second catalyst oxygen storage amount becomes the smallest. At this T4, the second catalyst inflow air fuel ratio A/F becomes the stoichiometric air fuel ratio. That is, when the target air fuel ratio of the internal combustion engine 1 is the lean-control time lean air fuel ratio AFLL, oxygen is stored into the first catalyst 3, so that the air fuel ratio of the exhaust gas flowing out from the first catalyst 3 becomes the stoichiometric air fuel ratio. On the other hand, when the target air fuel ratio of the internal combustion engine 1 is the lean-control time rich air fuel ratio AFLR, the oxygen stored in the first catalyst 3 is released, so that the air fuel ratio of the exhaust gas flowing out from the first catalyst 3 becomes the stoichiometric air fuel ratio. The second catalyst oxygen storage amount at this time decreases but is larger than 0. For this reason, oxygen is able to be stored into and released from the second catalyst 4, so the second catalyst outflow air fuel ratio A/F does not change, remaining at the stoichiometric air fuel ratio.

T5 is a point in time at which the first catalyst oxygen storage amount becomes a maximum value. That is, T5 is a point in time at which it becomes difficult to store oxygen in the first catalyst 3. Accordingly, the exhaust gas of the lean air fuel ratio begins to flow out from the first catalyst 3, so the second catalyst inflow air fuel ratio A/F gradually becomes the lean air fuel ratio.

T6 is a point in time at which the second catalyst oxygen storage amount reaches the upper limit threshold value. In order to change the air fuel ratio of the internal combustion engine 1 to the rich air fuel ratio before the second catalyst oxygen storage amount becomes the maximum value, at T6, the lean control is terminated and changed to the rich control. For this reason, the reference value of the first catalyst inflow air fuel ratio A/F changes from the reference lean air fuel ratio AFL to the reference rich air fuel ratio AFR. According to this, the first catalyst oxygen storage amount begins to decrease. In addition, the air fuel ratio of the exhaust gas flowing out from the first catalyst 3 gradually becomes small, so the second catalyst inflow air fuel ratio A/F also gradually becomes small.

T7 is a point in time at which the second catalyst oxygen storage amount becomes the largest. At this T7, the second catalyst inflow air fuel ratio A/F becomes the stoichiometric air fuel ratio. That is, when the target air fuel ratio of the internal combustion engine 1 is the rich-control time lean air fuel ratio AFRL, oxygen is stored into the first catalyst 3, so that the air fuel ratio of the exhaust gas flowing out from the first catalyst 3 becomes the stoichiometric air fuel ratio. On the other hand, when the target air fuel ratio of the internal combustion engine 1 is the rich-control time rich air fuel ratio AFRR, the oxygen stored in the first catalyst 3 is released, so that the air fuel ratio of the exhaust gas flowing out from the first catalyst 3 becomes the stoichiometric air fuel ratio. The second catalyst oxygen storage amount at this time increases but is smaller than the maximum value. For this reason, oxygen is able to be stored into and released from the second catalyst 4, so the second catalyst outflow air fuel ratio A/F does not change, remaining at the stoichiometric air fuel ratio. Here, in a period of time from T2 to T4, the second catalyst inflow air fuel ratio A/F is the rich air fuel ratio, so the exhaust gas of the rich air fuel ratio containing HC and CO is supplied to the second catalyst 4. On the other hand, in a period of time from T5 to T7, the second catalyst inflow air fuel ratio A/F is the lean air fuel ratio, so the exhaust gas of the lean air fuel ratio containing oxygen is supplied to the second catalyst 4. Accordingly, the exhaust gas of the rich air fuel ratio containing HC and CO and the exhaust gas of the lean air fuel ratio containing oxygen are alternately supplied to the second catalyst 4, too, so that the HC and CO are oxidized to produce heat in the second catalyst 4, too. As a result of this, the temperature of the second catalyst 4 further goes up. The reference rich air fuel ratio AFR and the reference lean air fuel ratio AFL have been obtained and set in advance by experiments, simulations or the like, in such a manner that the temperature of the second catalyst 4 may go up quickly and the second catalyst 4 may not be overheated.

T8 is a point in time at which the first catalyst oxygen storage amount becomes 0. That is, T8 is a point in time at which it becomes difficult to oxidize HC and CO in the first catalyst 3. Accordingly, the exhaust gas of the rich air fuel ratio begins to flow out from the first catalyst 3, so the second catalyst inflow air fuel ratio A/F gradually becomes the rich air fuel ratio. T9 is a point in time similar to T3; T10 is a point in time similar to T4; and T11 is a point in time similar to T5.

Thus, by repeating the rich control and the lean control in this manner, the exhaust gas of the lean air fuel ratio containing oxygen and the exhaust gas of the rich air fuel ratio containing HC and CO are supplied to the second catalyst 4 in an alternate manner, so that the temperature of the second catalyst 4 can be raised in a quick manner. Then, the second catalyst oxygen storage amount varies in a range in which the second catalyst outflow air fuel ratio A/F is able to maintain the stoichiometric air fuel ratio. That is, because the second catalyst outflow air fuel ratio A/F becomes constant at the stoichiometric air fuel ratio, NOx, HC and CO can be reduced or oxidized to a sufficient extent. Namely, it is possible to prevent the degree of leanness of the air fuel ratio from becoming too large in the second catalyst 4 during the lean control, thus suppressing the purification or reduction of NOx from becoming difficult. In addition, it is possible to prevent the degree of richness of the air fuel ratio from becoming too large in the second catalyst 4 during the rich control, thus suppressing the purification or oxidation of HC and CO from becoming difficult.

Here, note that in this embodiment, the rich control is carried out at the time of start of the temperature rise control, but instead of this, the lean control may be carried out. However, by carrying out the rich control first at the time of start of the temperature rise control, the deterioration of emissions can be suppressed in a more reliable manner as described below. Here, oxygen is stored in the first catalyst 3 and the second catalyst 4 at the time of operation at the stoichiometric air fuel ratio. The storage amounts of oxygen in the individual catalysts can be estimated based on the amount of intake air detected by the air flow meter 19, and the values of the air fuel ratios of the exhaust gases flowing into the individual catalysts detected by the first and second air fuel ratio sensors 11, 12, respectively, but in cases where any of the detected values by these sensors deviates from an actual value, the storage amounts of oxygen thus estimated will also deviate from actual values. In that case, there is a fear that the timing of changing from the rich control to the lean control, and the timing of changing from the lean control to the rich control, will deviate from suitable timing. As a result of this, there is also a fear that oxygen will become excessive or short in the second catalyst 4.

Figure 5:
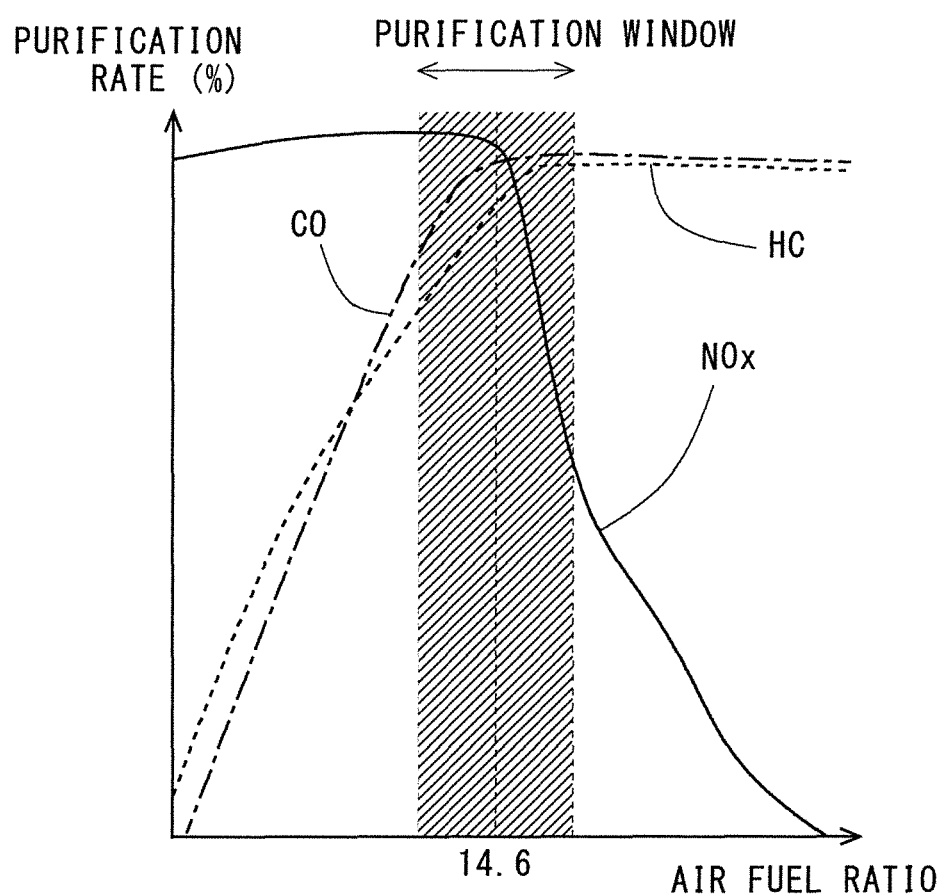
FIG. 5 is a view showing the relation between an air fuel ratio A/F and individual purification (reduction or oxidation) rates of HC, CO and NOx in a three-way catalyst.

Here, FIG. 5 is a view showing the relation between the air fuel ratio A/F and individual purification (oxidation or reduction) rates of HC, CO and NOx in each of the three-way catalysts. In FIG. 5, a predetermined region of the air fuel ratio of the exhaust gas shown by a diagonally shaded area indicates a purification window in which both of the reduction ratio of NOx and the oxidation rates of the HC and CO in the three-way catalyst become suitable values. As shown in FIG. 5, the predetermined region across the stoichiometric air fuel ratio (A/F=14.6) becomes the purification window of the three-way catalyst. In cases where the three-way catalyst is able to store oxygen, even if the air fuel ratio of the exhaust gas deviates or shifts to the lean side, the air fuel ratio in the three-way catalyst becomes the stoichiometric air fuel ratio due to the oxygen being stored into the three-way catalyst. However, when the air fuel ratio of the exhaust gas shifts to the lean side after a sufficient amount of oxygen has been stored into the three-way catalyst, the reduction rate of NOx will decrease. In addition, when the air fuel ratio of the exhaust gas shifts to the rich side after oxygen has been released from the three-way catalyst to a sufficient extent, the purification (oxidation) rates of HC and CO will decrease. Here, as shown in FIG. 5, an amount of decrease of the purification (reduction or oxidation) rate with respect to an amount of change of the air fuel ratio is larger for NOx than for HC and CO. Accordingly, it can be said that in cases where the air fuel ratio of the exhaust gas deviates or shifts from the stoichiometric air fuel ratio, the decrease of the purification rate becomes more remarkable in the case of shifting to the lean side than in the case of shifting to the rich side, and hence, the influence with respect to emissions in the case of shifting to the lean side is larger than in the case of shifting to the rich side. That is, it can be said that the effect of suppressing the deterioration of emissions is larger by suppressing oxygen from becoming excessive in the second catalyst 4 than by suppressing oxygen from running short therein. Accordingly, the effect of suppressing the deterioration of emissions may become large, by doing as follows.

Here, if the number of times of carrying out the lean control can be decreased, the amount of oxygen supplied to the second catalyst 4 will be decreased, thus making it possible to suppress oxygen from becoming excessive in the second catalyst 4. Then, in the case of carrying out the rich control and the lean control in an alternate manner in the temperature rise control, the number of times of carrying out the lean control can be decreased by one in some cases, by first carrying out the rich control and then carrying out the lean control. That is, when starting from the rich control and ending with the rich control, the number of times of carrying out the lean control will be smaller by one than the number of times of carrying out the rich control. In this manner, because the number of times of the lean control becomes smaller by one, the rich control and the lean control may be able to be ended before the oxygen in the second catalyst 4 becomes excessive. In addition, even in cases where the oxygen in the second catalyst 4 becomes excessive and NOx flows out from the second catalyst 4 when the rich control and the lean control are carried out in a repeated manner, if the number of times of carrying out the lean control is smaller even by one, it is possible to decrease the amount of NOx flowing out from the second catalyst 4. In this manner, by starting with the rich control at the time of starting the temperature rise control, the reduction rate of NOx can be suppressed from decreasing.

In addition, in the temperature rise control according to this embodiment, the rich control is first carried out and a first target air fuel ratio is set to the rich air fuel ratio, but instead of this, any of the rich control and the lean control may be carried out at first, and the target air fuel ratio may also be set to the lean air fuel ratio. However, by setting the first target air fuel ratio to the rich air fuel ratio, the deterioration of emissions can be suppressed in a more reliable manner as described below. As explained in FIG. 5, it can be said that the effect of suppressing the deterioration of emissions is larger by suppressing oxygen from becoming excessive in the second catalyst 4 than by suppressing oxygen from running short therein. Then, when the target air fuel ratio is made to vary to the lean air fuel ratio and the rich air fuel ratio in the temperature rise control, in the case where the target air fuel ratio is first made to be the rich air fuel ratio, the number of times at which the target air fuel ratio becomes the lean air fuel ratio may be smaller by one than that at which the target air fuel ratio becomes the rich air fuel ratio, as compared with the case where the target air fuel ratio is first made to be the lean air fuel ratio. That is, in cases where the target air fuel ratio is first made to be the rich air fuel ratio at the time of starting the rich control or the lean control, and where the target air fuel ratio at the end of that control is the rich air fuel ratio, the number of times at which the target air fuel ratio becomes the lean air fuel ratio is smaller by one than the number of times at which the target air fuel ratio becomes the rich air fuel ratio. Then, when the number of times at which the target air fuel ratio becomes the lean air fuel ratio is smaller by one, the amount of oxygen to be supplied to the second catalyst 4 will accordingly become smaller, so the rich control or the lean control may be able to be ended before oxygen becomes excessive. In addition, even in cases where the oxygen in the second catalyst 4 becomes excessive and NOx flows out from the second catalyst 4 when the target air fuel ratio varies between the rich side and the lean side across the stoichiometric air fuel ratio, if the number of times at which the target air fuel ratio becomes the lean air fuel ratio is smaller even by one, it will be able to decrease the amount of NOx flowing out from the second catalyst 4 by an amount of NOx which would have flowed out from the second catalyst 4 when the target air fuel ratio would become the lean air fuel ratio. In this manner, by making the target air fuel ratio to be the rich control at the time of starting the temperature rise control, the reduction rate of NOx can be suppressed from decreasing.

Moreover, in this embodiment, the air fuel ratio is controlled so that at the time of the rich control, the rich deviation dAFRR at the time of the rich control becomes smaller than the lean deviation dAFRL at the time of the rich control, and the rich period of time TRR at the time of the rich control becomes longer than the lean period of time TRL at the time of the rich control. However, as described above, in cases where the air fuel ratio of the exhaust gas deviates or shifts from the stoichiometric air fuel ratio, the influence with respect to emissions in the case of shifting to the lean side is larger than in the case of shifting to the rich side. That is, it can be said that emissions are hard to deteriorate more at the time of the rich control than at the time of the lean control. Accordingly, at the time of the rich control, for example, the air fuel ratio may be controlled in such a manner that the rich deviation dAFRR at the time of the rich control becomes equal to the lean deviation dAFRL at the time of the rich control, and the rich period of time TRR at the time of the rich control becomes equal to the lean period of time TRL at the time of the rich control.

Further, in this embodiment, among a plurality of times of the rich control which are carried out during one temperature rise control, the same control as a first rich control is carried out for a second or any subsequent rich control, but instead of this, in the second and subsequent rich control, the magnitude relation between the rich deviation dAFRR at the time of the rich control and the lean deviation dAFRL at the time of the rich control, and the magnitude relation between the rich period of time TRR at the time of the rich control and the lean period of time TRL at the time of the rich control, can be changed. For example, in the second and subsequent rich control, the air fuel ratio may be controlled in such a manner that the rich deviation dAFRR at the time of the rich control and the lean deviation dAFRL at the time of the rich control become equal to each other, and that the rich period of time TRR at the time of the rich control and the lean period of time TRL at the time of the rich control become equal to each other. That is, only at the time of the first rich control, the air fuel ratio may be controlled in such a manner that the rich deviation dAFRR at the time of the rich control becomes smaller than the lean deviation dAFRL at the time of the rich control, and that the rich period of time TRR at the time of the rich control becomes longer than the lean period of time TRL at the time of the rich control. In this case, at least the first rich control can be carried out until the release of the oxygen stored in the second catalyst 4 is completed. That is, the first rich control is carried out until the oxygen is released from the second catalyst 4 to a sufficient extent.

Here, at the time of the first rich control, an estimated value of the storage amount of oxygen may deviate or shift from an actual value thereof, so HC and CO are apt to flow out from the second catalyst 4. Thus, by controlling the air fuel ratio in such a manner that the rich deviation dAFRR at the time of the rich control becomes small at the time of the first rich control in which HC and CO are most apt to flow out, the concentrations of HC and CO flowing out from the second catalyst 4 can be reduced. In this case, when the temperature rise control is started in step S105 in FIG. 3, the rich control is started in such a manner that the rich deviation dAFRR at the time of the rich control becomes smaller than the lean deviation dAFRL at the time of the rich control, and that the rich period of time TRR at the time of the rich control becomes longer than the lean period of time TRL at the time of the rich control. Then, when the rich control is started in step S112, it is started in such a manner that the rich deviation dAFRR at the time of the rich control and the lean deviation dAFRL at the time of the rich control become equal to each other, and that the rich period of time TRR at the time of the rich control the lean period of time TRL at the time of the rich control become equal to each other.

Even in cases where the estimated value of the storage amount of oxygen deviates or shifts from the actual value at the time of start of the temperature rise control, the estimated value of the storage amount of oxygen in the second catalyst 4 can be reset, by carrying out at least the first rich control until the release of the oxygen stored in the second catalyst 4 is completed (i.e., until the storage amount of oxygen becomes 0). With this, the accuracy of subsequent estimation of the storage amount of oxygen can be enhanced, so it is possible to suppress the oxygen in the second catalyst 4 from becoming excessive or short during the execution of subsequent rich control or lean control. Here, note that the completion of the release of the oxygen stored in the second catalyst 4 may be determined based on the detected value of the third air fuel ratio sensor 13, but instead of this, the execution time of the rich control in which the release of the oxygen stored in the second catalyst 4 is completed has been obtained in advance by experiments, simulations or the like, and by carrying out the rich control only for this execution time, a determination may be made that the release of the oxygen stored in the second catalyst 4 is completed, whether the storage amount of oxygen takes any value at the time of start of the temperature rise control.

Second Embodiment

In the above-mentioned first embodiment, the storage amount of oxygen in the second catalyst 4 is estimated, and the rich control and the lean control are alternately changed based on the thus estimated value of the storage amount of oxygen. On the other hand, in this second embodiment, the rich control and the lean control are alternately changed based on the detected value of the third air fuel ratio sensor 13. That is, in this second embodiment, feedback control is carried out. As explained in the first embodiment, the estimated value of the storage amount of oxygen may deviate or shift from the actual value thereof. In cases where such a deviation occurs, there is a fear that the effect of the temperature rise of the second catalyst 4 may decrease.

Figure 6:
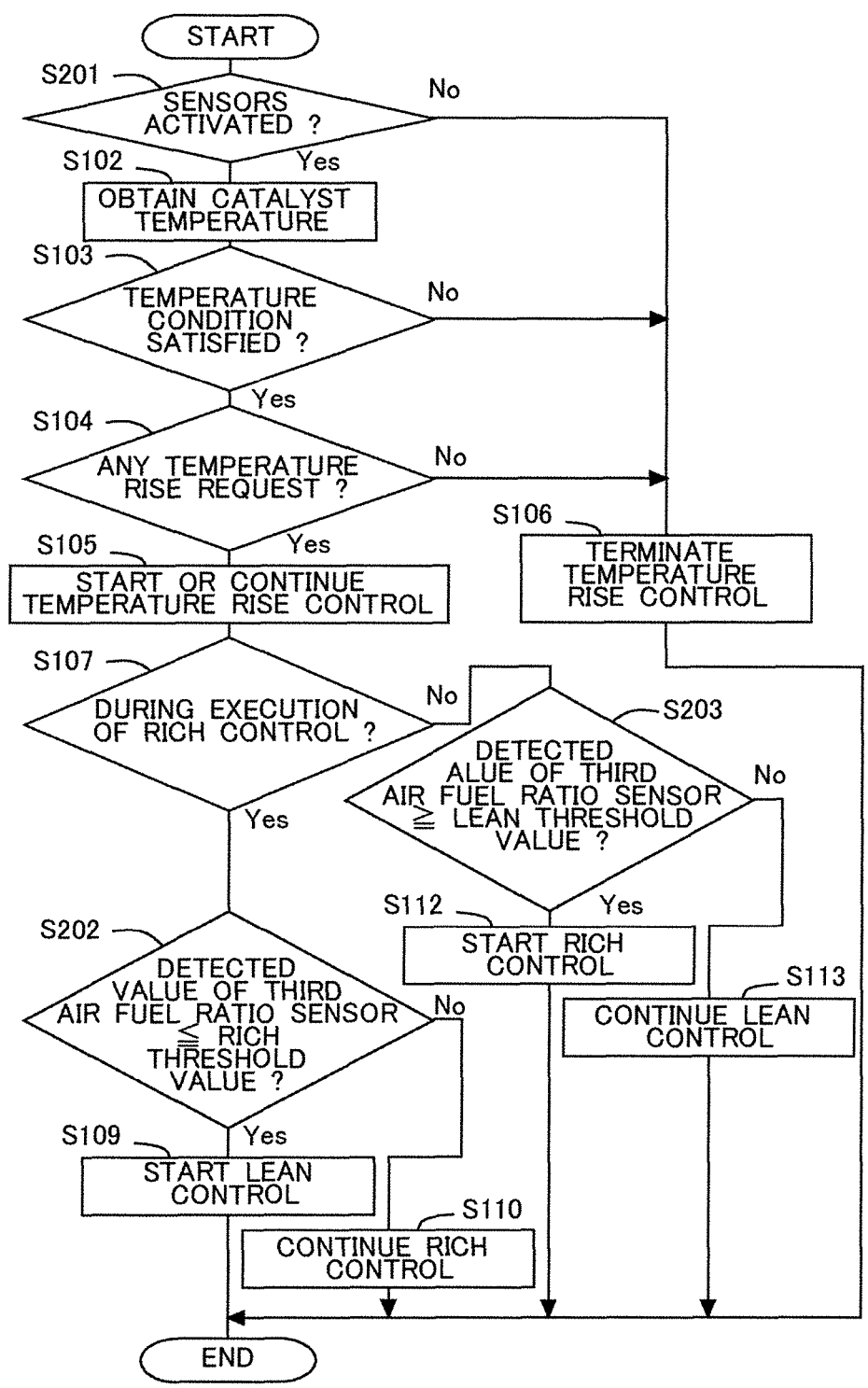
FIG. 6 is a flow chart showing a flow for temperature rise control according to a second embodiment.

FIG. 6 is a flow chart showing a flow or routine for the temperature rise control according to this second embodiment. The routine in this flow chart is carried out by means of the ECU 10 at each predetermined time interval. In FIG. 6, for those steps in which the same processings as in the flow chart shown in FIG. 3 are carried out, the same reference numerals and characters are attached and the explanation thereof is omitted.

In step S201, it is determined whether an air fuel ratio sensor used in the temperature rise control has been activated. In the temperature rise control according to this flow chart, the detected value of the third air fuel ratio sensor 13 is used, as will be described later. Accordingly, in this step S201, it is determined whether the third air fuel ratio sensor 13 has been activated. In cases where the third air fuel ratio sensor 13 has reached an activation temperature, a determination is made that the sensor has been activated. Here, the third air fuel ratio sensor 13 is provided with a heater for heating the sensor. For example, in cases where a sufficient period of time has elapsed after starting electrical energization to the heater for heating the third air fuel ratio sensor 13, it is assumed that the third air fuel ratio sensor 13 has reached the activation temperature. This sufficient period of time can be obtained in advance through experiments, simulations, or the like. In cases where an affirmative determination is made in step S201, the routine goes to step S102, whereas in cases where a negative determination is made, the routine goes to step S106.

In addition, in the flow chart shown in FIG. 6, in cases where an affirmative determination is made in step S107, the routine goes to step S202. In step S202, it is determined whether the detected value of the third air fuel ratio sensor 13 is equal to or less than a rich threshold value. The rich threshold value is an air fuel ratio at which it can be said that the release of oxygen from the second catalyst 4 has been completed. That is, in cases where a sufficient amount of oxygen has been stored in the second catalyst 4, even if the rich control is being carried out, the air fuel ratio of the exhaust gas flowing out from the second catalyst 4 becomes the stoichiometric air fuel ratio. On the other hand, during the execution of the rich control, oxygen is released from the second catalyst 4. Then, when the HC and CO flowing into the second catalyst 4 becomes unable to be oxidized, the air fuel ratio of the exhaust gas flowing out from the second catalyst 4 will become the rich air fuel ratio. Accordingly, in cases where the detected value of the third air fuel ratio sensor 13 becomes equal to or less than the rich threshold value, a determination can be made that the release of oxygen from the second catalyst 4 has been completed, so the rich control is changed to the lean control. The rich threshold value has been obtained in advance through experiments, simulations or the like. In cases where an affirmative determination is made in step S202, the routine goes to step S109, whereas in cases where a negative determination is made, the routine goes to step S110.

Moreover, in the flow chart shown in FIG. 6, when a negative determination is made in step S107, the routine goes to step S203. In step S203, it is determined whether the detected value of the third air fuel ratio sensor 13 is equal to or more than a lean threshold value. The lean threshold value is an air fuel ratio at which it can be said that the storage of oxygen into the second catalyst 4 has been completed. That is, in cases where a sufficient amount of oxygen has not been stored in the second catalyst 4, even if the lean control is being carried out, the air fuel ratio of the exhaust gas flowing out from the second catalyst 4 becomes the stoichiometric air fuel ratio. On the other hand, during the execution of the lean control, oxygen is stored into the second catalyst 4. Then, when the storage amount of oxygen in the second catalyst 4 comes near to an upper limit value thereof and the second catalyst 4 becomes unable to store oxygen, the air fuel ratio of the exhaust gas flowing out from the second catalyst 4 will become the lean air fuel ratio. Accordingly, in cases where the detected value of the third air fuel ratio sensor 13 becomes equal to or less than the lean threshold value, a determination can be made that the storage of oxygen into the second catalyst 4 has been completed, so the lean control is changed to the rich control. The lean threshold value has been obtained in advance through experiments, simulations or the like. In cases where an affirmative determination is made in step S203, the routine goes to step S112, whereas in cases where a negative determination is made, the routine goes to step S113.

Figure 7:
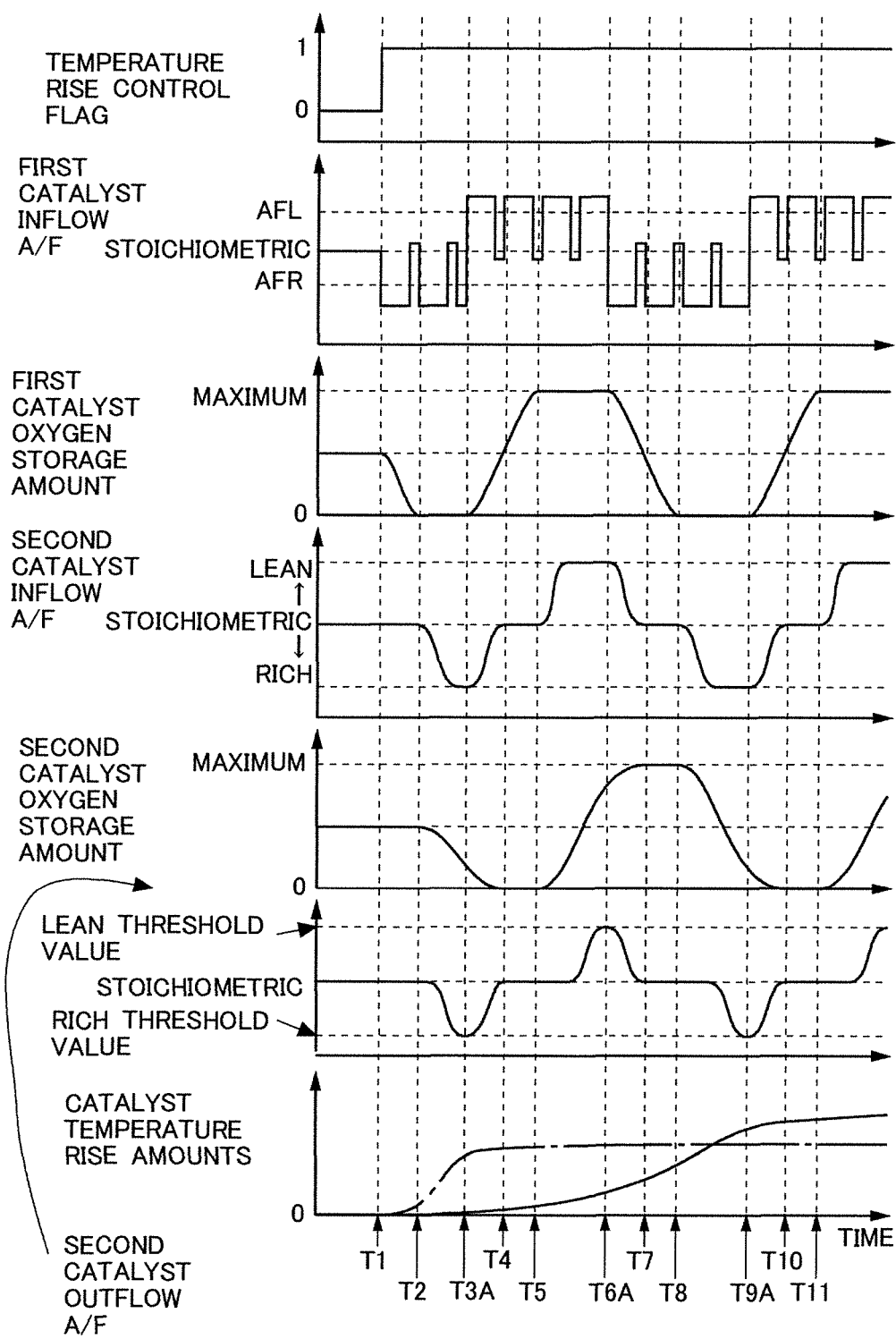
FIG. 7 is a time chart showing the changes over time of a variety of kinds of values when the temperature rise control according to the second embodiment is carried out.

FIG. 7 is a time chart showing the changes over time of a variety of kinds of values when the temperature rise control according to the second embodiment is carried out. In FIG. 7, in order from the top, a temperature rise control flag, a first catalyst inflow air fuel ratio A/F, a first catalyst oxygen storage amount, a second catalyst inflow air fuel ratio A/F, a second catalyst oxygen storage amount, a second catalyst outflow air fuel ratio A/F, and catalyst temperature rise amounts are shown. In FIG. 7, T3A and T9A each indicate a point in time at which the second catalyst outflow air fuel ratio A/F reaches the rich threshold value, and T6A indicates a point in time at which the second catalyst outflow air fuel ratio A/F reaches the lean threshold value.

In this second embodiment, after starting the rich control, the rich control is continued until the time in point of T3A at which the second catalyst outflow air fuel ratio A/F becomes equal to or less than the rich threshold value. That is, in the above-mentioned first embodiment, the second catalyst outflow air fuel ratio A/F during the rich control is the stoichiometric air fuel ratio, but in this second embodiment, the second catalyst outflow air fuel ratio A/F becomes the rich air fuel ratio during the rich control. Then, at the point in time T3A at which the second catalyst outflow air fuel ratio A/F becomes equal to or less than the rich threshold value, the rich control is changed to the lean control. As a result of this, the second catalyst oxygen storage amount decreases to 0. On the other hand, in this second embodiment, after starting the lean control, the lean control is continued until the point in time of T6A at which the second catalyst outflow air fuel ratio A/F becomes equal to or less than the lean threshold value. That is, in the above-mentioned first embodiment, the second catalyst outflow air fuel ratio A/F during the lean control is the stoichiometric air fuel ratio, but in this second embodiment, the second catalyst outflow air fuel ratio A/F becomes the lean air fuel ratio during the lean control. Then, at the point in time T6A at which the second catalyst outflow air fuel ratio A/F becomes equal to or more than the lean threshold value, the lean control is changed to the rich control. As a result of this, the second catalyst oxygen storage amount increases to a maximum value.

Thus, by carrying out feedback control using the detected value of the third air fuel ratio sensor 13 in this manner, the timing to change between the lean control and the rich control can be set in an appropriate manner, even though the estimated value of the storage amount of oxygen deviates from the actual value thereof.

Third Embodiment

In the above-mentioned second embodiment, the rich control and the lean control are alternately changed based on the detected value of the third air fuel ratio sensor 13. That is, the lean control is carried out until the air fuel ratio in the second catalyst 4 becomes the lean air fuel ratio, and the rich control is carried out until the air fuel ratio in the second catalyst 4 becomes the rich air fuel ratio. Then, when the air fuel ratio in the second catalyst 4 becomes the lean air fuel ratio at the time of the lean control, a decrease in the reduction rate of NOx will become remarkable. Accordingly, in this third embodiment, the timing to change from the rich control to the lean control is decided based on the detected value of the third air fuel ratio sensor 13, similar to the above-mentioned second embodiment. On the other hand, the timing to change from the lean control to the rich control is decided based on the estimated value of the storage amount of oxygen, similar to the above-mentioned first embodiment.

Figure 8:
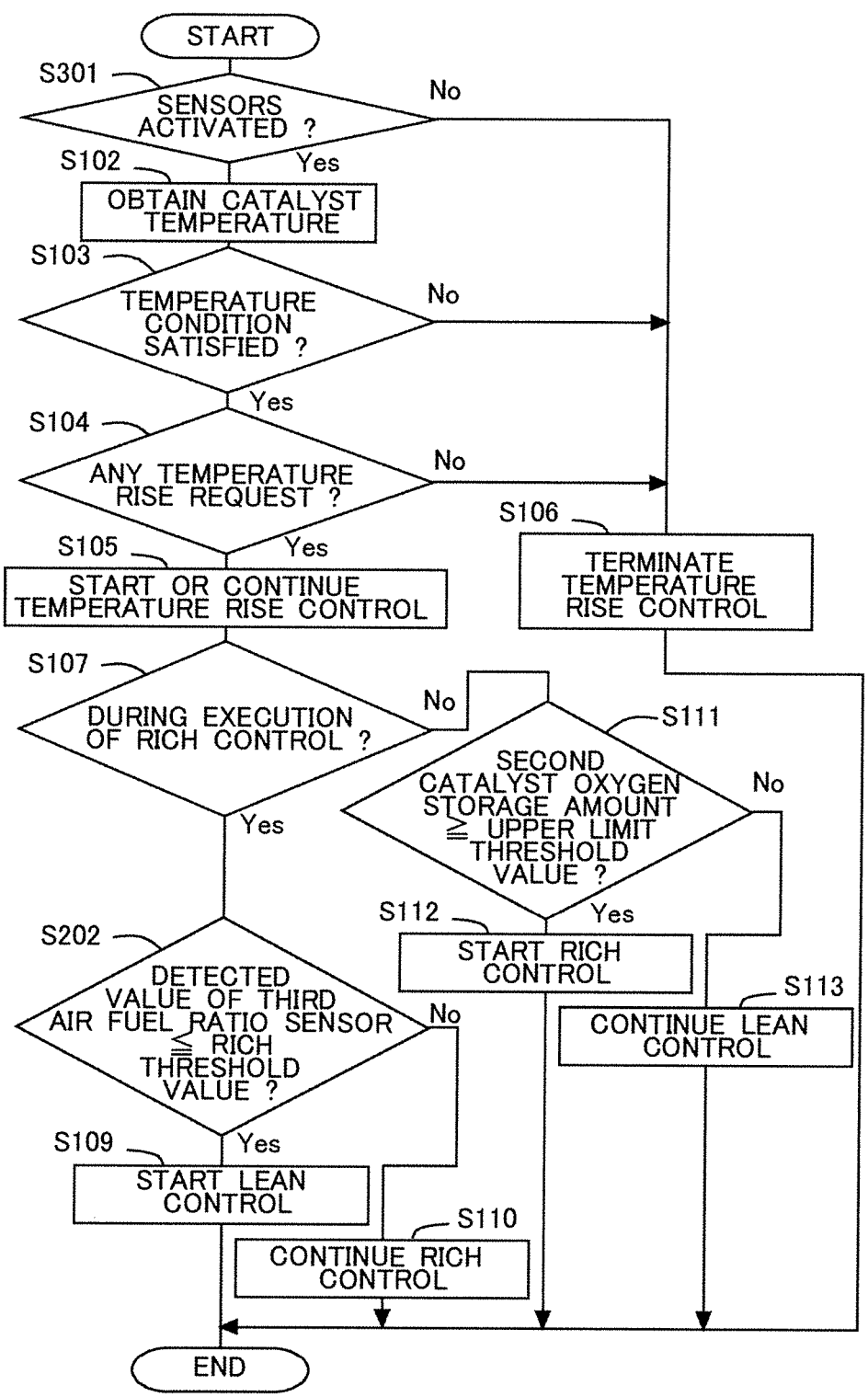
FIG. 8 is a flow chart showing a flow for temperature rise control according to a third embodiment.

FIG. 8 is a flow chart showing a flow or routine for the temperature rise control according to this third embodiment. The routine in this flow chart is carried out by means of the ECU 10 at each predetermined time interval. In FIG. 8, for those steps in which the same processings as in the flow chart shown in FIG. 3 or FIG. 6 is carried out, the same reference numerals and characters are attached and the explanation thereof is omitted.

In step S301, it is determined whether the air fuel ratio sensors used in the temperature rise control have been activated. In the temperature rise control according to this flow chart, the detected values of the first air fuel ratio sensor 11, the second air fuel ratio sensor 12 and the third air fuel ratio sensor 13 are used, as will be described later. Accordingly, in this step S301, it is determined whether the first air fuel ratio sensor 11, the second air fuel ratio sensor 12 and the third air fuel ratio sensor 13 have each been activated. In cases where the first air fuel ratio sensor 11, the second air fuel ratio sensor 12 and the third air fuel ratio sensor 13 have each reached an activation temperature, a determination is made that these sensors have been activated. For example, in cases where a sufficient period of time has elapsed after starting electrical energization to the heaters for heating the sensors, it is assumed that these sensors have reached the activation temperature. In cases where an affirmative determination is made in step S301, the routine goes to step S102, whereas in cases where a negative determination is made, the routine goes to step S106.

In addition, in the flow chart shown in FIG. 8, in cases where an affirmative determination is made in step S107, the routine goes to step S202, whereas in cases where a negative determination is made, the routine goes to step S111. That is, during the rich control, the rich control is continued until the air fuel ratio of the exhaust gas flowing out from the second catalyst 4 becomes equal to or less than the rich threshold value, and during the lean control, the lean control is continued until the storage amount of oxygen in the second catalyst 4 becomes equal to or more than the upper limit threshold value.

Figure 9:
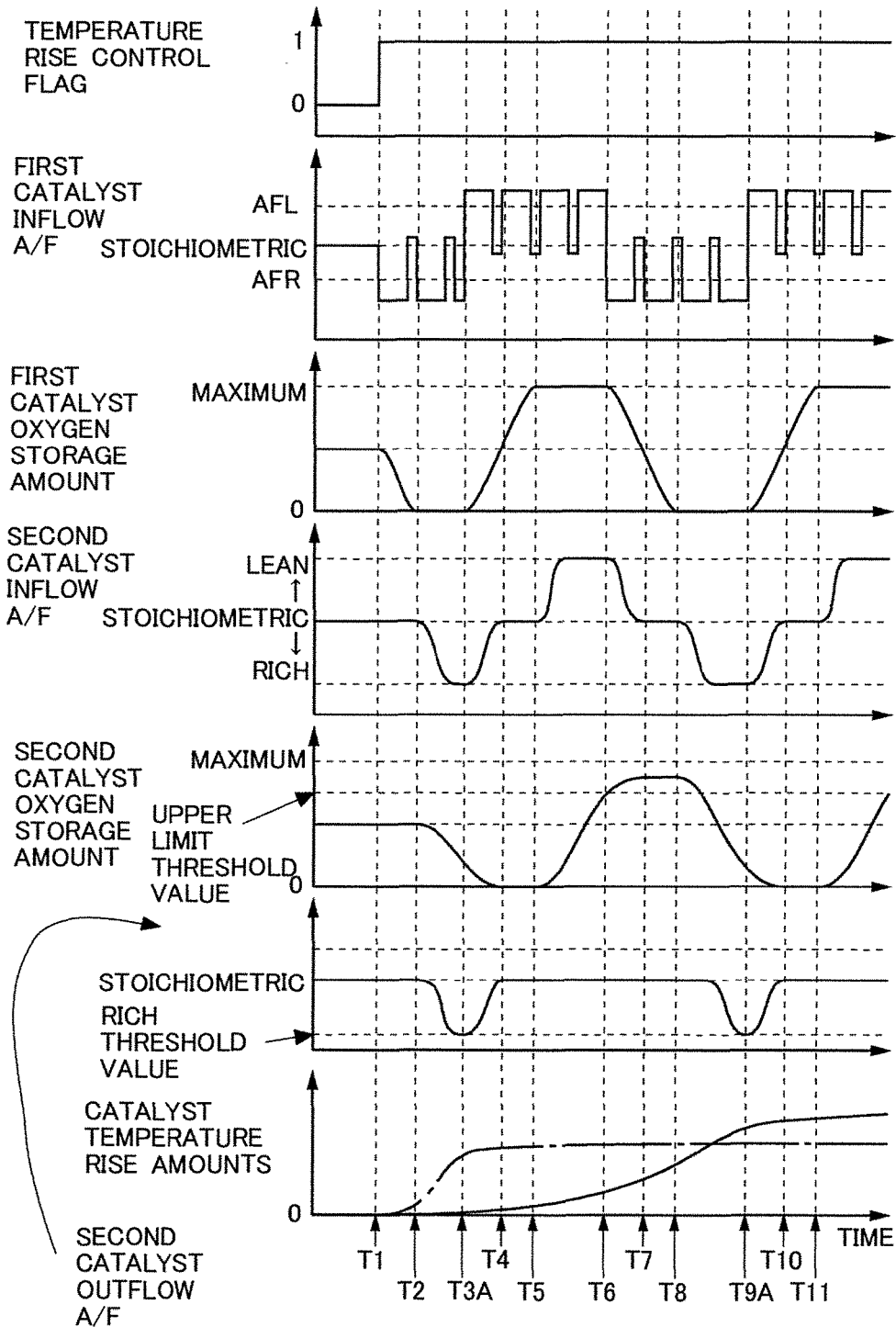
FIG. 9 is a time chart showing the changes over time of a variety of kinds of values when the temperature rise control according to the third embodiment is carried out.

FIG. 9 is a time chart showing the changes over time of a variety of kinds of values when the temperature rise control according to the third embodiment is carried out. In FIG. 9, in order from the top, a temperature rise control flag, a first catalyst inflow air fuel ratio A/F, a first catalyst oxygen storage amount, a second catalyst inflow air fuel ratio A/F, a second catalyst oxygen storage amount, a second catalyst outflow air fuel ratio A/F, and catalyst temperature rise amounts are shown.

In this third embodiment, during the rich control, when the second catalyst outflow air fuel ratio A/F becomes equal to or less than the rich threshold value at T3A and T9A, the rich control is changed to the lean control, similar to the above-mentioned second embodiment. For this reason, in the rich control, the second catalyst oxygen storage amount decreases to 0. In the rich control, the timing to change to the lean control is decided based on the detected value of the third air fuel ratio sensor 13, so that such a change can be made at a suitable timing based on the detected value of the third air fuel ratio sensor 13, even though the estimated value of the second catalyst oxygen storage amount has deviated or shifted from the actual value thereof. In addition, in cases where the estimated value of the second catalyst oxygen storage amount has deviated or shifted from the actual value thereof, a state where the second catalyst oxygen storage amount has become zero can be detected by the detected value of the third air fuel ratio sensor 13, and hence, at this time, the estimated value of the second catalyst oxygen storage amount can be reset. With this, the accuracy of the estimated value of the second catalyst oxygen storage amount can be enhanced.

On the other hand, during the lean control, when the second catalyst oxygen storage amount becomes equal to or more than the upper limit threshold value at T6, the lean control is changed to the rich control, similar to the above-mentioned first embodiment. Accordingly, in the lean control, the lean control is changed to the rich control before the second catalyst oxygen storage amount increases to the maximum value. In addition, in the lean control, the second catalyst outflow air fuel ratio A/F does not shift to a leaner side than the stoichiometric air fuel ratio. In this manner, it is possible to suppress the NOx reduction rate in the second catalyst 4 from decreasing during the lean control.

Fourth Embodiment

In this fourth embodiment, the reference rich air fuel ratio AFR is gradually made larger from immediately after the lean control has changed to the rich control. Also, the reference lean air fuel ratio AFL is gradually made smaller from immediately after the rich control has changed to the lean control. Here, note that in this fourth embodiment, at the time of the lean control or the rich control, the target air fuel ratio of the internal combustion engine 1 may be made to vary to the lean air fuel ratio and the rich air fuel ratio, so that a mean air fuel ratio in a period of time, which is a sum of one period of time for the rich air fuel ratio and one period of time for the lean air fuel ratio which is adjacent to the one period of time for the rich air fuel ratio, becomes the reference lean air fuel ratio or the reference rich air fuel ratio.

Figure 10:
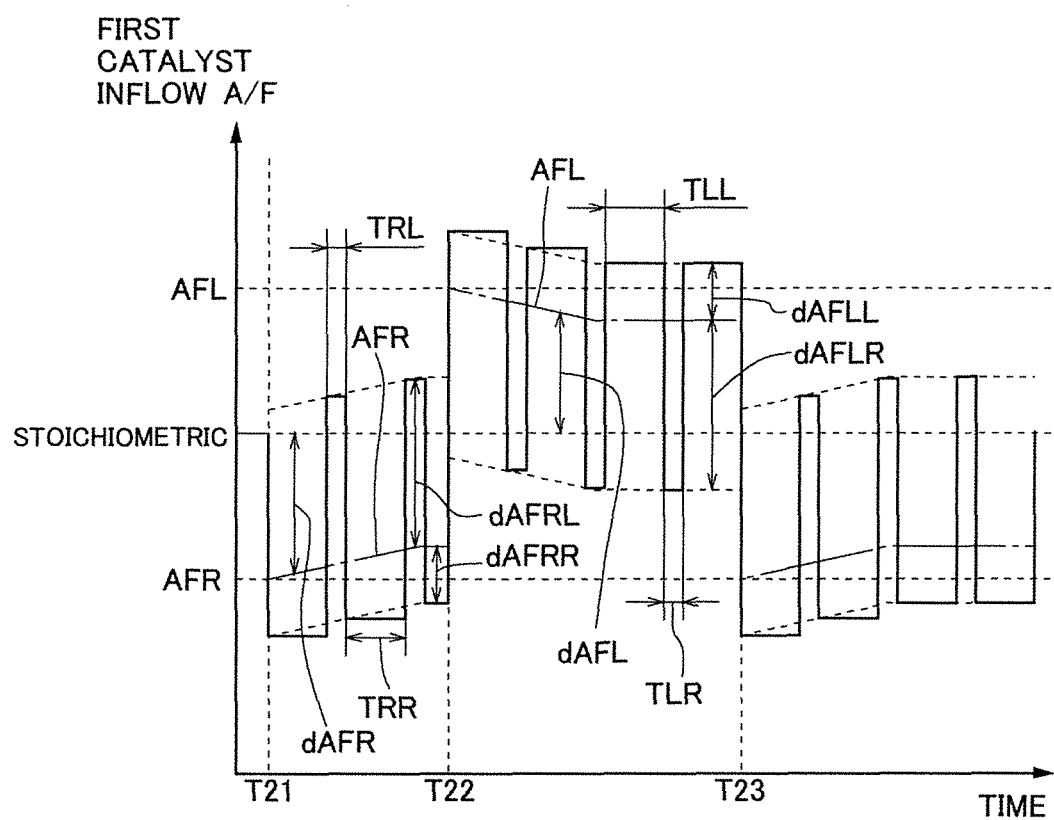
FIG. 10 is a time chart showing the change over time of a first catalyst inflow air fuel ratio A/F according to a fourth embodiment.

FIG. 10 is a time chart showing the change over time of the first catalyst inflow air fuel ratio A/F according to this fourth embodiment. In FIG. 10, alternate long and short dash lines indicate the reference rich air fuel ratio AFR and the reference lean air fuel ratio AFL. In FIG. 10, at T21, the temperature rise control is started from the rich control; at T22, it is changed from the rich control to the lean control; and at T23, it is changed from the lean control to the rich control.

The reference rich air fuel ratio AFR immediately after the rich control is started at T21 is the same as that in the first embodiment, but after that, as the rich-control time rich air fuel ratio AFRR and the rich-control time lean air fuel ratio AFRL become larger in a stepwise manner, the reference rich air fuel ratio AFR becomes larger with the lapse of time. That is, the reference deviation dAFR at the time of the rich control gradually becomes larger. Here, note that at this time, the rich deviation dAFRR at the time of the rich control, the lean deviation dAFRL at the time of the rich control, the rich period of time TRR at the time of the rich control, and the lean period of time TRL at the time of the rich control, are the same as those in the above-mentioned first embodiment.

In addition, the reference lean air fuel ratio AFL immediately after the lean control is started at T22 is the same as that in the first embodiment, but after that, when the lean-control time lean air fuel ratio AFLL and the lean-control time rich air fuel ratio AFLR become smaller in a stepwise manner, the reference lean air fuel ratio AFL also becomes smaller with the lapse of time. That is, the reference deviation dAFL at the time of the lean control gradually becomes larger. Here, note that at this time, the lean deviation dAFLL at the time of the lean control, the rich deviation dAFLR at the time of the lean control, the lean period of time TLL at the time of the lean control, and the rich period of time TLR at the time of the lean control, are the same as those in the above-mentioned first embodiment.

Here, immediately after the start of each rich control, a large amount of oxygen is stored in the first catalyst 3 and the second catalyst 4, so HC and CO can be oxidized in both the first catalyst 3 and the second catalyst 4, and hence, HC and CO hardly flow out from the second catalyst 4. On the other hand, when the oxygen stored in the first catalyst 3 is lost due to the continuation of the rich control thus started, HC and CO will be oxidized only in the second catalyst 4. For this reason, when the concentrations of the HC and CO in the exhaust gas is high, the HC and CO will flow out from the second catalyst 4, without being fully oxidized in the second catalyst 4 alone. Accordingly, in cases where the reference rich air fuel ratio AFR is constant or fixed, the longer the execution time of the rich control, the more easily the HC and CO flow out from the second catalyst 4. In contrast to this, by gradually making the reference rich air fuel ratio AFR larger during the rich control, the amounts of HC and CO flowing into the first catalyst 3 and the second catalyst 4 can be adjusted according to the amounts of HC and CO which can be oxidized in the first catalyst 3 and the second catalyst 4, as a result of which it is possible to suppress the HC and CO from flowing out from the second catalyst 4. In addition, immediately after starting the rich control, the degree of richness of the air fuel ratio is large, so larger amounts of HC and CO can be supplied to the first catalyst 3 and the second catalyst 4, and hence, the effect of the temperature rise can be made larger.

Moreover, immediately after the start of each rich control, a sufficient amount of oxygen has been released from the first catalyst 3 and the second catalyst 4, so oxygen can be stored in both the first catalyst 3 and the second catalyst 4. In this case, the reduction rates of NOx in the first catalyst 3 and the second catalyst are high, so NOx hardly flows out from the second catalyst 4. On the other hand, when a sufficient amount of oxygen has been stored in the first catalyst 3 due to the continuation of the started lean control, it will become difficult to reduce NOx in the first catalyst 3, and hence, NOx will be reduced only in the second catalyst 4. For this reason, when the degree of leanness of the exhaust gas is large, the NOx will flow out from the second catalyst 4, without being fully reduced in the second catalyst 4 alone. Accordingly, in cases where the reference lean air fuel ratio AFL is constant or fixed, the longer the execution time of the lean control, the more easily the NOx flows out from the second catalyst 4. In contrast to this, by gradually making the reference lean air fuel ratio AFL smaller during the lean control, the degree of leanness of the exhaust gas in the second catalyst 4 can be adjusted according to the amounts of NOx which can be reduced in the first catalyst 3 and the second catalyst 4, as a result of which it is possible to suppress the NOx from flowing out from the second catalyst 4. In addition, immediately after starting the lean control, the degree of leanness of the air fuel ratio is large, so a larger amount of oxygen can be supplied to the first catalyst 3 and the second catalyst 4, and hence, the effect of the temperature rise can be made larger.

Figure 11:
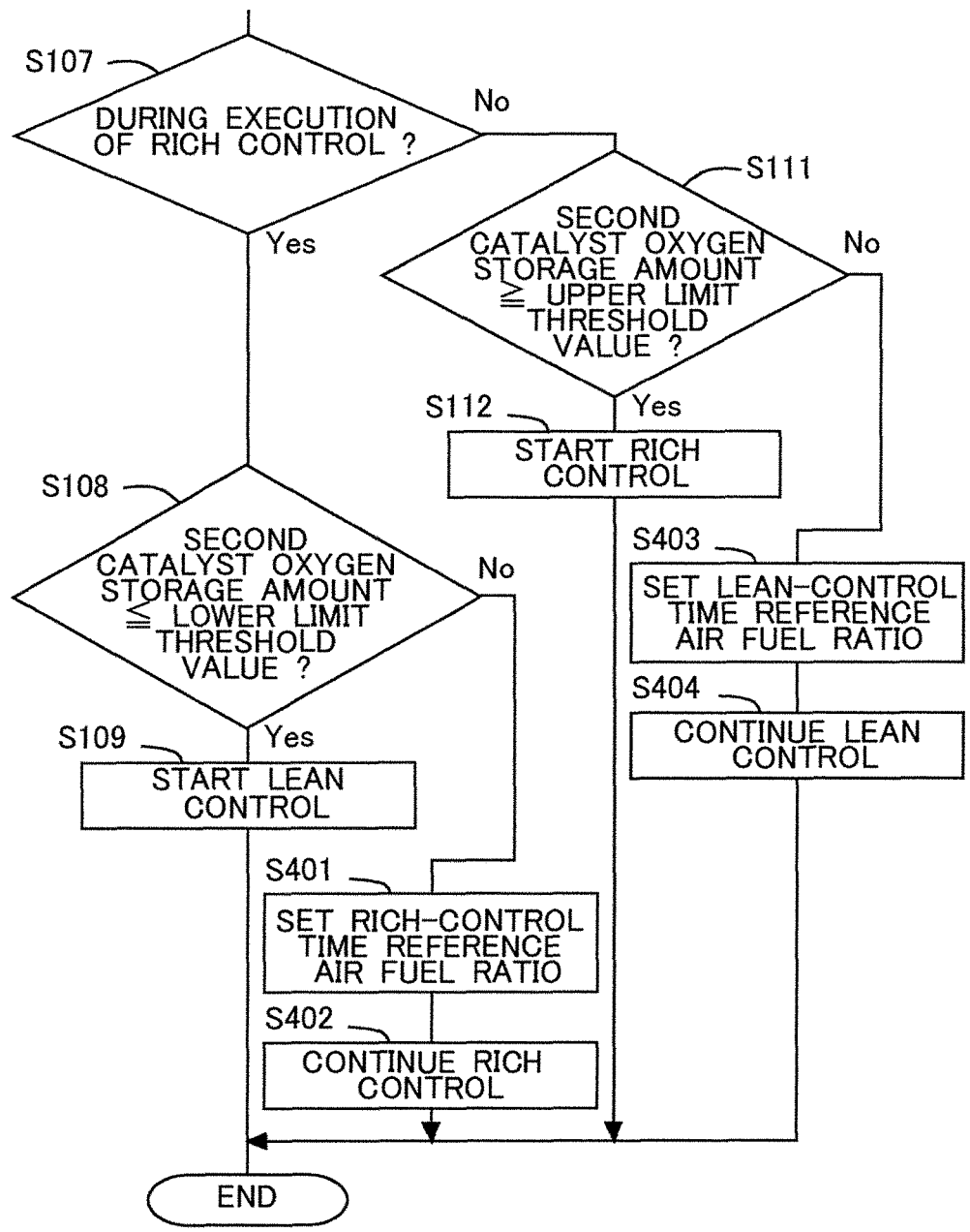
FIG. 11 is a flow chart showing a flow for temperature rise control according to the fourth embodiment.

FIG. 11 is a flow chart showing a flow or routine for the temperature rise control according to this fourth embodiment. The routine in this flow chart is carried out by means of the ECU 10 at each predetermined time interval. In FIG. 11, for those steps in which the same processings as in the flow charts shown in the above-mentioned embodiments are carried out, the same reference numerals and characters are attached and the explanation thereof is omitted. In addition, the processings before step S107 in FIG. 11 are the same as those in the flow chart shown in FIG. 3, so the illustration thereof is omitted.

In the flow chart shown in FIG. 11, in cases where a negative determination is made in step S108, the routine goes to step S401. In step S401, the reference rich air fuel ratio AFR is set. The reference rich air fuel ratio AFR is set based on, for example, a period of time elapsed from the start point in time of the rich control, or an estimated value of the storage amount of oxygen in the first catalyst 3 or the second catalyst 4. That is, it is set in such a manner that the longer the period of time elapsed from the start point in time of the rich control, or the smaller the storage amount of oxygen in the first catalyst 3 or the second catalyst 4, the larger the reference rich air fuel ratio AFR becomes in the range of the rich air fuel ratio which is at a richer side than the stoichiometric air fuel ratio. In addition, it may also be set in such a manner that the smaller the air fuel ratio of the exhaust gas flowing out from the first catalyst 3 or the second catalyst 4, the larger the reference rich air fuel ratio AFR becomes in the range of the rich air fuel ratio which is at a richer side than the stoichiometric air fuel ratio. These relations have been obtained in advance by experiments, simulations or the like, and stored in the ECU 10.

Here, note that an upper limit value may be set for the reference rich air fuel ratio AFR in advance, and the reference rich air fuel ratio AFR may be set so as not to exceed this upper limit value. This upper limit value has been obtained in advance by experiments, simulations or the like, in consideration of the period of time required for the temperature rise of the second catalyst 4, and the amounts of HC and CO which can be oxidized in the second catalyst 4. In cases where the upper limit value is too small, i.e., the degree of richness of the exhaust gas is large, HC and CO will become unable to be oxidized in the second catalyst 4, and may flow out from the second catalyst 4, whereas in cases where the upper limit value is too large, i.e., the degree of richness of the exhaust gas is small, the period of time required for the temperature rise of the second catalyst 4 will become long. For these reasons, an optimum value for the upper limit value may be obtained by experiments, simulations or the like. Here, note that the rich deviation dAFRR at the time of the rich control, the lean deviation dAFRL at the time of the rich control, the rich period of time TRR at the time of the rich control, and the lean period of time TRL at the time of the rich control, are the same as those in the above-mentioned first embodiment. Then, the processing of step S401 ends, the routine goes to step S402. In step S402, the rich control is carried out so that the air fuel ratio becomes the reference rich air fuel ratio AFR set in step S401.

Further, in the flow chart shown in FIG. 11, in cases where a negative determination is made in step S111, the routine goes to step S403. In step S403, the reference lean air fuel ratio AFL is set. The reference lean air fuel ratio AFL is set based on, for example, a period of time elapsed from the start point in time of the lean control, or an estimated value of the storage amount of oxygen in the first catalyst 3 or the second catalyst 4. That is, it is set in such a manner that the longer the period of time elapsed from the start point in time of the lean control, or the larger the storage amount of oxygen in the first catalyst 3 or the second catalyst 4, the smaller the reference lean air fuel ratio AFL becomes in the range of the lean air fuel ratio which is at a leaner side than the stoichiometric air fuel ratio. In addition, it may also be set in such a manner that the larger the air fuel ratio of the exhaust gas flowing out from the first catalyst 3 or the second catalyst 4, the smaller the reference lean air fuel ratio AFL becomes in the range of the lean air fuel ratio which is at a leaner side than the stoichiometric air fuel ratio. These relations have been obtained in advance by experiments, simulations or the like, and stored in the ECU 10.

Here, note that a lower limit value may be set for the reference lean air fuel ratio AFL in advance, and the reference lean air fuel ratio AFL may be set so as not to become smaller than this lower limit value. This lower limit value has been obtained in advance by experiments, simulations or the like, in consideration of the period of time required for the temperature rise of the second catalyst 4, and the amount of NOx which can be reduced in the second catalyst 4. In cases where the lower limit value is too large, i.e., the degree of leanness of the exhaust gas is large, NOx will become unable to be reduced in the second catalyst 4, and may flow out from the second catalyst 4, whereas in cases where the lower limit value is too small, i.e., the degree of leanness of the exhaust gas is small, the period of time required for the temperature rise of the second catalyst 4 will become long. For these reasons, an optimum value for the lower limit value may be obtained by experiments, simulations or the like. Here, note that the lean deviation dAFLL at the time of the lean control, the rich deviation dAFLR at the time of the lean control, the lean period of time TLL at the time of the lean control, and the rich period of time TLR at the time of the lean control, are the same as those in the above-mentioned first embodiment. Then, the processing of step S403 ends, the routine goes to step S404. In step S404, the lean control is carried out so that the air fuel ratio becomes the reference lean air fuel ratio AFL set in step S403.

Figure 12:
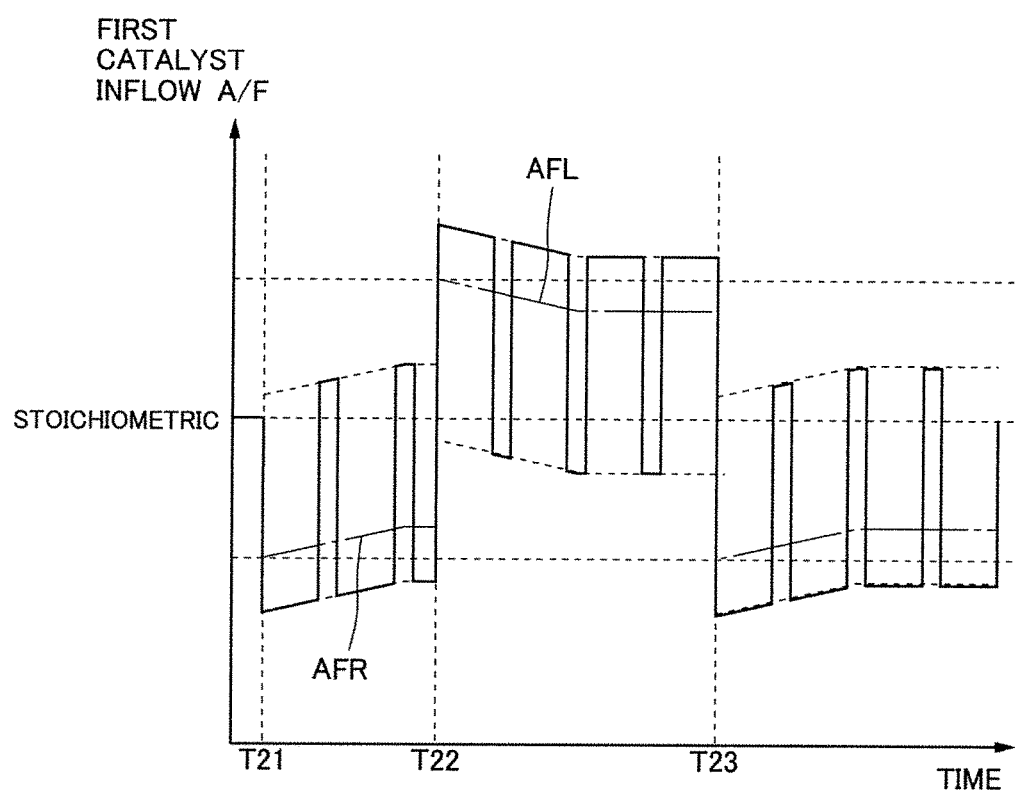
FIG. 12 is another time chart showing the change over time of the first catalyst inflow air fuel ratio A/F according to the fourth embodiment.

In addition, in this fourth embodiment, the air fuel ratio may be changed, as shown in FIG. 12. FIG. 12 is another time chart showing the change over time of the first catalyst inflow air fuel ratio A/F according to this fourth embodiment. In FIG. 12, alternate long and short dash lines indicate the reference rich air fuel ratio AFR and the reference lean air fuel ratio AFL.

In FIG. 10, the rich-control time rich air fuel ratio AFRR, the rich-control time lean air fuel ratio AFRL, the lean-control time lean air fuel ratio AFLL and the lean-control time rich air fuel ratio AFLR are each changed in a stepwise manner, but in FIG. 12, the rich-control time rich air fuel ratio AFRR, the rich-control time lean air fuel ratio AFRL, the lean-control time lean air fuel ratio AFLL and the lean-control time rich air fuel ratio AFLR are each changed in a continuous manner. In this way, too, it is possible to suppress HC and CO from flowing out from the second catalyst 4 during the rich control, as well as to suppress NOx from flowing out from the second catalyst 4 during the lean control.

Fifth Embodiment

In this fifth embodiment, in cases where oxygen has been released from the first catalyst 3 to a sufficient extent during the rich control, the target air fuel ratio of the internal combustion engine 1 is made large in the range of the rich air fuel ratio which is at a richer side than the stoichiometric air fuel ratio. On the other hand, in cases where oxygen has been stored in the first catalyst 3 to a sufficient extent during the lean control, the target air fuel ratio of the internal combustion engine 1 is made small in the range of the lean air fuel ratio which is at a leaner side than the stoichiometric air fuel ratio.

Figure 13:
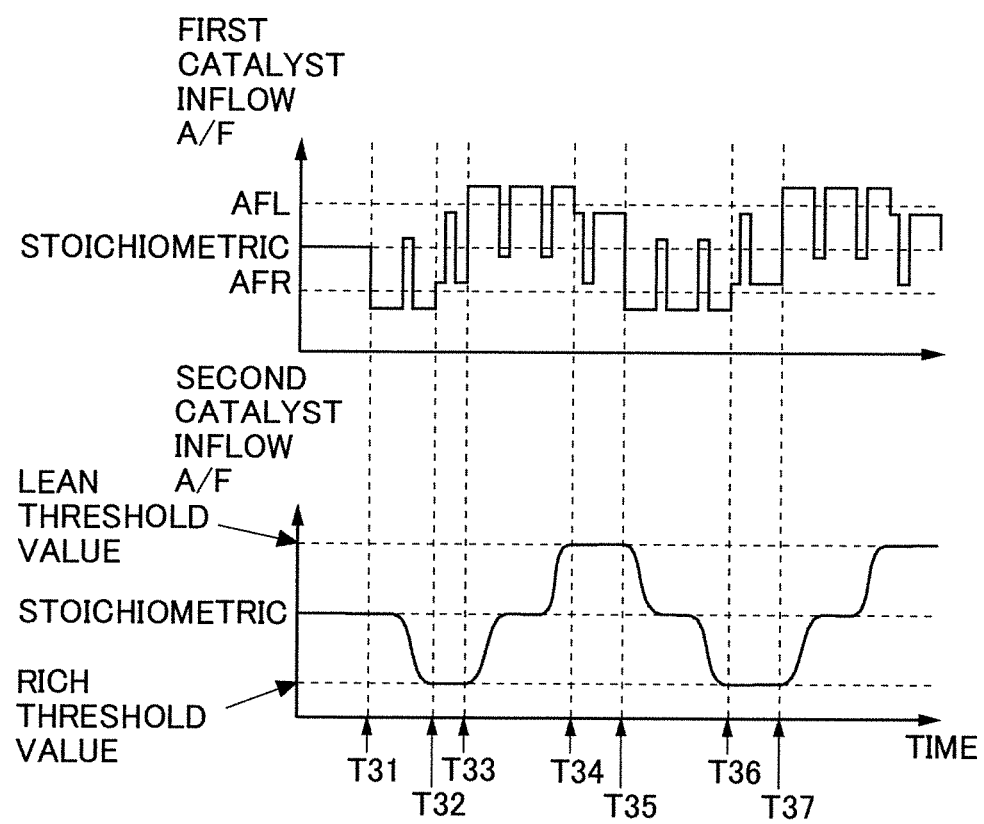
FIG. 13 is a time chart showing the changes over time of a first catalyst inflow air fuel ratio A/F and a second catalyst inflow air fuel ratio A/F according to a fifth embodiment.

FIG. 13 is a time chart showing the changes over time of a first catalyst inflow air fuel ratio A/F and a second catalyst inflow air fuel ratio A/F according to this fifth embodiment. In FIG. 13, at T31, the temperature rise control is started from the rich control; at T33, it is changed from the rich control to the lean control; at T35, it is changed from the lean control to the rich control; and at T37, it is changed from the rich control to the lean control.

In addition, at T32, the second catalyst inflow air fuel ratio A/F reaches the rich threshold value, by which it is judged that the storage amount of oxygen in the first catalyst 3 has become small to a sufficient extent, so that the reference rich air fuel ratio AFR is made larger in the range of the rich air fuel ratio. In this case, in FIG. 13, the reference deviation dAFR at the time of the rich control is made larger, and the rich deviation dAFRR at the time of the rich control and the lean deviation dAFRL at the time of the rich control are not changed, but instead of this, the rich deviation dAFRR at the time of the rich control and the lean deviation dAFRL at the time of the rich control may each be changed to become smaller.

The rich threshold value referred to herein is an air fuel ratio at which it can be said that the release of oxygen from the first catalyst 3 has been completed. Accordingly, after the second catalyst inflow air fuel ratio A/F has reached the rich threshold value, HC and CO will be oxidized only in the second catalyst 4. For this reason, when the concentrations of the HC and CO in the exhaust gas is high, the HC and CO will flow out from the second catalyst 4, without being fully oxidized in the second catalyst 4 alone. Accordingly, in cases where the reference rich air fuel ratio AFR is constant or fixed, after the second catalyst inflow air fuel ratio A/F has reached the rich threshold value, the HC and CO becomes apt to flow out from the second catalyst 4. In contrast to this, after the second catalyst inflow air fuel ratio A/F has reached the rich threshold value, by making the reference rich air fuel ratio AFR larger, the amounts of HC and CO flowing into the first catalyst 3 and the second catalyst 4 can be adjusted according to the amounts of HC and CO which can be oxidized in the first catalyst 3 and the second catalyst 4, as a result of which it is possible to suppress the HC and CO from flowing out from the second catalyst 4. In addition, immediately after starting the rich control, larger amounts of HC and CO can be supplied to the first catalyst 3 and the second catalyst 4, and hence, the effect of the temperature rise can be made larger.

Moreover, at T34, the second catalyst inflow air fuel ratio A/F reaches the lean threshold value, by which it is judged that the storage amount of oxygen in the first catalyst 3 has become large to a sufficient extent, so that the reference lean air fuel ratio AFL is made smaller in the range of the lean air fuel ratio. In this case, in FIG. 13, the reference deviation dAFL at the time of the lean control is made smaller, and the lean deviation dAFLL at the time of the lean control and the rich deviation dAFLR at the time of the lean control are not changed, but instead of this, the lean deviation dAFLL at the time of the lean control and the rich deviation dAFLR at the time of the lean control may each be changed to become smaller.

The lean threshold value referred to herein is an air fuel ratio at which it can be said that the storage of oxygen into the first catalyst 3 has been completed. Accordingly, after the second catalyst inflow air fuel ratio A/F has reached the lean threshold value, NOx will be reduced only in the second catalyst 4. For this reason, when the degree of leanness of the exhaust gas is large, the NOx will flow out from the second catalyst 4, without being fully reduced in the second catalyst 4 alone. Accordingly, in cases where the reference lean air fuel ratio AFL is constant or fixed, after the second catalyst inflow air fuel ratio A/F has reached the lean threshold value, the NOx becomes apt to flow out from the second catalyst 4. In contrast to this, after the second catalyst inflow air fuel ratio A/F has reached the lean threshold value, by making the reference lean air fuel ratio AFL smaller, the degree of leanness of the exhaust gas in the second catalyst 4 can be adjusted according to the amounts of NOx which can be reduced in the first catalyst 3 and the second catalyst 4, as a result of which it is possible to suppress the NOx from flowing out from the second catalyst 4. In addition, immediately after starting the lean control, larger amounts of oxygen can be supplied to the first catalyst 3 and the second catalyst 4, and hence, the effect of the temperature rise can be made larger.

In this way, it is possible to suppress HC and CO from flowing out from the second catalyst 4 during the rich control, as well as to suppress NOx from flowing out from the second catalyst 4 during the lean control.

Figure 14:
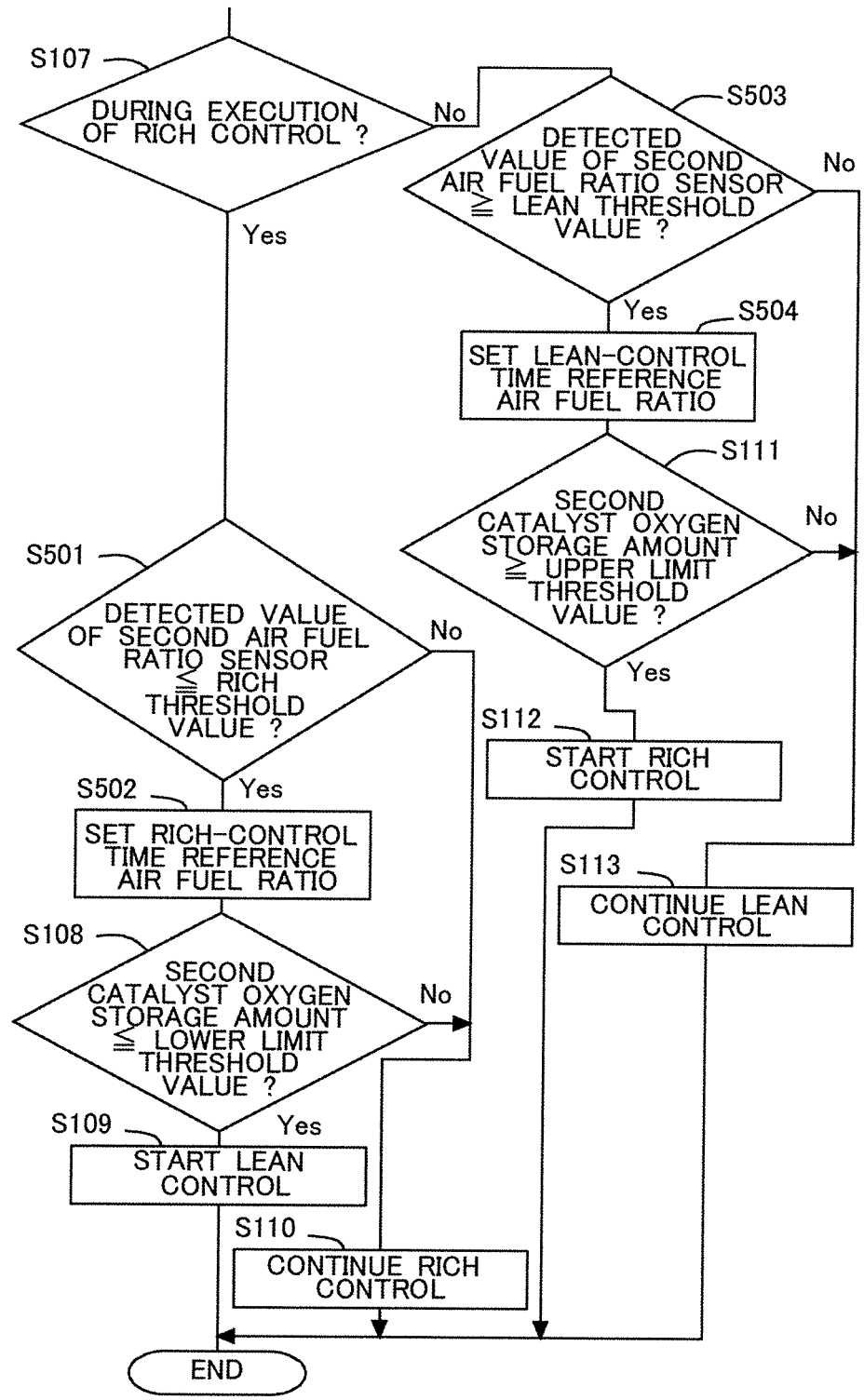
FIG. 14 is a flow chart showing a flow for temperature rise control according to the fifth embodiment.

FIG. 14 is a flow chart showing a flow or routine for the temperature rise control according to this fifth embodiment. The routine in this flow chart is carried out by means of the ECU 10 at each predetermined time interval. In FIG. 14, for those steps in which the same processings as in the flow charts shown in the above-mentioned embodiments are carried out, the same reference numerals and characters are attached and the explanation thereof is omitted. In addition, the processings before step S107 in FIG. 14 are the same as those in the flow chart shown in FIG. 3, so the illustration thereof is omitted.

In the flow chart shown in FIG. 14, in cases where an affirmative determination is made in step S107, the routine goes to step S501. In step S501, it is determined whether the detected value of the second air fuel ratio sensor 12 is equal to or less than the rich threshold value. That is, in cases where a sufficient amount of oxygen has been stored in the first catalyst 3, even if the rich control is being carried out, the air fuel ratio of the exhaust gas flowing out from the first catalyst 3 becomes the stoichiometric air fuel ratio. On the other hand, during the execution of the rich control, oxygen is released from the first catalyst 3, and when the HC and CO flowing into the first catalyst 3 becomes unable to be oxidized, the air fuel ratio of the exhaust gas flowing out from the first catalyst 3 will become the rich air fuel ratio. Accordingly, in cases where the detected value of the second air fuel ratio sensor 12 becomes equal to or less than the rich threshold value, a determination can be made that the release of oxygen from the first catalyst 3 has been completed. In cases where an affirmative determination is made in step S501, the routine goes to step S502, whereas in cases where a negative determination is made, the routine goes to step S110.

In step S502, the reference rich air fuel ratio AFR is changed or made larger in the range of the rich air fuel ratio. The reference rich air fuel ratio AFR after the change has been obtained in advance through experiments, simulations or the like. When the processing of step S502 ends, the routine goes to step S108.

Further, in the flow chart shown in FIG. 14, in cases where a negative determination is made in step S107, the routine goes to step S503. In step S503, it is determined whether the detected value of the second air fuel ratio sensor 12 is equal to or more than the lean threshold value. That is, in cases where a sufficient amount of oxygen has not been stored in the first catalyst 3, even if the lean control is being carried out, the air fuel ratio of the exhaust gas flowing out from the first catalyst 3 becomes the stoichiometric air fuel ratio. On the other hand, during the execution of the lean control, oxygen is stored into the first catalyst 3, and when the storage amount of oxygen in the first catalyst 3 comes near to an upper limit value thereof and the first catalyst 3 becomes unable to store oxygen, oxygen flows out from the first catalyst 3 so that the air fuel ratio of the exhaust gas flowing out from the first catalyst 3 becomes the lean air fuel ratio. Accordingly, in cases where the detected value of the second air fuel ratio sensor 12 becomes equal to or less than the lean threshold value, a determination can be made that the storage of oxygen into the first catalyst 3 has been completed. In cases where an affirmative determination is made in step S503, the routine goes to step S504, whereas in cases where a negative determination is made, the routine goes to step S113.

In step S504, the reference lean air fuel ratio AFL is changed or made smaller in the range of the lean air fuel ratio. The reference lean air fuel ratio AFL after the change has been obtained in advance through experiments, simulations or the like. When the processing of step S504 ends, the routine goes to step S111.

As described above, according to this fifth embodiment, it is possible to suppress HC and CO from flowing out from the second catalyst 4 during the rich control, as well as to suppress NOx from flowing out from the second catalyst 4 during the lean control.

The invention claimed is:

1. An exhaust gas purification apparatus for an internal combustion engine comprising:
   a first catalyst in a form of a three-way catalyst that is arranged in an exhaust passage of the internal combustion engine, and has an oxygen storage capacity;
   a second catalyst in the form of a three-way catalyst that is arranged in said exhaust passage at a downstream side of said first catalyst, and has an oxygen storage capacity; and
   a controller configured to make a target air fuel ratio of said internal combustion engine vary;
   wherein said controller configured to carry out lean control and rich control in an alternate manner, said lean control setting a reference lean air fuel ratio, which is an air fuel ratio set as a target mean value of the target air fuel ratio at the time of making the target air fuel ratio of said internal combustion engine vary and which is an air fuel ratio leaner than a stoichiometric air fuel ratio, said lean control making the target air fuel ratio of said internal combustion engine vary between a first lean air fuel ratio, which is an air fuel ratio leaner than said reference lean air fuel ratio, and a first rich air fuel ratio, which is an air fuel ratio richer than the stoichiometric air fuel ratio, and said rich control setting a reference rich air fuel ratio, which is an air fuel ratio set as a target mean value of the target air fuel ratio at the time of making the target air fuel ratio of said internal combustion engine vary and which is an air fuel ratio richer than the stoichiometric air fuel ratio, said rich control making the target air fuel ratio of said internal combustion engine vary between a second lean air fuel ratio, which is an air fuel ratio leaner than the stoichiometric air fuel ratio, and a second rich air fuel ratio, which is an air fuel ratio richer than the reference rich air fuel ratio; and
   when making said target air fuel ratio vary in the case of carrying out said lean control, said controller configured to make makes a period per one time in which said target air fuel ratio becomes said first lean air fuel ratio longer than a period per one time in which said target air fuel ratio becomes said first rich air fuel ratio, and make a deviation of said first lean air fuel ratio from said reference lean air fuel ratio smaller than a deviation of said first rich air fuel ratio from said reference lean air fuel ratio.

2. The exhaust gas purification apparatus for an internal combustion engine as set forth in claim 1, wherein
   when making said target air fuel ratio vary in the case of carrying out said rich control, said controller is further configured to make a period per one time in which said target air fuel ratio becomes said second rich air fuel ratio longer than a period per one time in which said target air fuel ratio becomes said second lean air fuel ratio, and make a deviation of said second rich air fuel ratio from said reference rich air fuel ratio smaller than a deviation of said second lean air fuel ratio from said reference rich air fuel ratio.

3. The exhaust gas purification apparatus for an internal combustion engine as set forth in claim 1, wherein
   when carrying out said lean control and said rich control in an alternate manner, said controller is further configured to first carry out said rich control.

4. The exhaust gas purification apparatus for an internal combustion engine as set forth in claim 1, wherein
   when carrying out said lean control and said rich control in an alternate manner, said controller is further configured to first carry out said rich control; and
   when making said target air fuel ratio vary in the case of carrying out said rich control at least first time, said controller is further configured to make a period per one time in which said target air fuel ratio becomes said second rich air fuel ratio longer than a period per one time in which said target air fuel ratio becomes said second lean air fuel ratio, and make a deviation of said second rich air fuel ratio from said reference rich air fuel ratio smaller than a deviation of said second lean air fuel ratio from said reference rich air fuel ratio, wherein said at least first rich control is carried out until a release of oxygen stored in said second catalyst is completed.

5. The exhaust gas purification apparatus for an internal combustion engine as set forth in claim 1, wherein
   when starting said lean control, said controller is further configured to first make said target air fuel ratio to be said first rich air fuel ratio, or when starting said rich control, said controller is further configured to first make said target air fuel ratio to be said second rich air fuel ratio.

6. The exhaust gas purification apparatus for an internal combustion engine as set forth in claim 1, wherein said controller is further configured to make said reference rich air fuel ratio at an end point in time of said rich control leaner than that at a start point in time thereof.

7. The exhaust gas purification apparatus for an internal combustion engine as set forth in claim 1, wherein
said controller is further configured to make said reference lean air fuel ratio at an end point in time of said lean control richer than that at a start point in time thereof.

* * * * *